(12) United States Patent
Satoh

(10) Patent No.: US 6,966,699 B2
(45) Date of Patent: Nov. 22, 2005

(54) DYNAMIC PRESSURE BEARING DEVICE, AND MANUFACTURING METHOD AND ASSEMBLY JIG THEREOF

(75) Inventor: Kimio Satoh, Akishima (JP)

(73) Assignee: Relial Corporation, Tokyo (JP)

( * ) Notice: Subject to any disclaimer, the term of this patent is extended or adjusted under 35 U.S.C. 154(b) by 0 days.

(21) Appl. No.: 10/295,958

(22) Filed: Nov. 18, 2002

(65) Prior Publication Data

US 2004/0223672 A1 Nov. 11, 2004

(30) Foreign Application Priority Data

Sep. 18, 2002 (JP) .................................. 2002-270921

(51) Int. Cl.$^7$ .............................................. F16C 32/06
(52) U.S. Cl. .................................. 384/107; 384/121
(58) Field of Search .................... 384/100, 107–124, 384/133; 360/99.08, 98.07; 310/90

(56) References Cited

U.S. PATENT DOCUMENTS

| 4,938,611 | A | * | 7/1990 | Nii et al. ..................... 384/133 |
| 5,580,175 | A | * | 12/1996 | Polch et al. ................. 384/113 |
| 5,692,840 | A | * | 12/1997 | Rhoton et al. ............... 384/110 |
| 5,743,655 | A | | 4/1998 | Slavin et al. |
| 6,190,573 | B1 | * | 2/2001 | Ito ........................... 252/62.55 |
| 6,300,695 | B1 | | 10/2001 | Neal |
| 6,390,681 | B1 | * | 5/2002 | Nakazeki et al. ........... 384/107 |

FOREIGN PATENT DOCUMENTS

| EP | 1 136 710 A1 | 9/2001 |
| JP | A 10-96421 | 4/1998 |

* cited by examiner

*Primary Examiner*—Thomas R. Hannon
(74) *Attorney, Agent, or Firm*—Oliff & Berridge, PLC

(57) ABSTRACT

It is an object of the present invention to provide a miniaturized, high-precision, easy, and low-cost dynamic pressure bearing device and a manufacturing method thereof. In manufacturing a dynamic pressure bearing device, a first and a second ring-shaped member are fixedly fitted to an outer peripheral surface of a rotating shaft member to constitute a rotating portion, an intermediate member is disposed between these members to constitute a fixed portion, a thrust bearing portion is formed in gaps between the first and second ring-shaped members and the intermediate member, and a journal bearing portion is formed in a gap between the rotating shaft member of the rotating portion and the intermediate member, the first and second ring-shaped members being fixed only with an adhesive applied on surfaces thereof which is to be fitted to the rotating shaft member.

1 Claim, 10 Drawing Sheets

DYNAMIC PRESSURE BEARING DEVICE, AND MANUFACTURING METHOD AND ASSEMBLY JIG THEREOF

BACKGROUND OF THE INVENTION

1. Field of the Invention

The present invention relates to a dynamic pressure bearing device including a fixed portion and a rotating portion supported rotatably by this fixed portion via a dynamic pressure bearing portion, and to a manufacturing method and an assembly jig thereof, and is applicable, for example, not only to a disk-rotating-type memory such as a drive unit for a hard disk drive (HDD) and a digital versatile disk (DVD) but also to a polygon mirror and so on.

2. Description of Related Art

A dynamic pressure bearing device is generally so structured that a dynamic pressure is given to an operating oil which is filled in a gap between a rotating portion including a rotating shaft and a fixed portion by utilizing a rotational force of the rotating shaft, and this dynamic pressure brings the rotating portion into a levitated state relative to the fixed portion, thereby supporting the rotating shaft rotatably.

In this dynamic pressure bearing device, a dynamic pressure bearing portion which generates the dynamic pressure to support the rotating shaft is generally includes a journal bearing portion receiving a force acting in a direction perpendicular to the rotating shaft (a diameter direction) and a thrust bearing portion receiving a force acting in a direction along the rotating shaft (for example, refer to Japanese Patent Laid-open No. Hei 10-96421 and so on).

In a dynamic pressure bearing device in a miniature motor such as a spindle motor for an HDD, a width dimension of the gap which is formed between the rotating portion and the fixed portion when the rotating portion is supported in the levitated state relative to the fixed portion by the dynamic pressure generated in accordance with the rotation of the rotating shaft is generally set to about 2 $\mu$m to about 3 $\mu$m in both of the journal bearing portion and the thrust bearing portion, in consideration of the areas of facing surfaces thereof, load capacitance, viscosity of a fluid, and so on.

The width dimension of this gap is an important factor having a decisive influence on a levitating force, a loss torque, or bearing stiffness and variation in the width dimension of this gap causes a large variation in performance of the dynamic pressure bearing. Therefore, the deviation from a set value of the width dimension of the gap which is formed when the rotating portion is actually supported in the levitated state needs to be controlled within ±several tenths $\mu$m, and the deviation of this dimension is conventionally controlled by making constituent parts of the device highly precise and by screening and combining parts.

However, since an adhesive is used for fixing the constituent parts of the device due to lack of space to be used for fastening tools such as screws and it is difficult to control variation in thickness of the solidified adhesive to be small, it is difficult to control the variation in the width dimension of the gap in the dynamic pressure bearing portion, especially the gap in the thrust bearing portion, within a desired range.

Further, in this dynamic pressure bearing device, a fluid is filled as the operating oil constituting the dynamic pressure bearing portion, and a lubricating oil or a magnetic oil is used as this fluid. Here, a low-viscosity liquid which undergoes a small secular change is mainly used as the fluid used as the operating oil from the viewpoint of power consumption reduction, life elongation of the dynamic pressure bearing, and so on.

One of the objects of using the magnetic fluid is that outward dispersion of the operating oil is prevented by forming an appropriate magnetic circuit inside the bearing. Another object is that, when an ordinary lubricating oil is used as the operating oil in the HDD and so on, static electricity on a disk which is generated during the rotation of the disk cannot be transmitted from the rotating portion to the fixed portion due to no conductivity of the lubricating oil, but when, on the other hand, the magnetic fluid is used as the operating oil, the static electricity can be transmitted from the rotating portion to the fixed portion via the conductive magnetic fluid to be grounded so that the destruction of a read/write head due to electrostatic discharge is prevented.

When the magnetic fluid is used as the operating oil, a ferromagnetic field is formed in the vicinity of the boundary surface between the magnetic fluid and an external space and the magnetic fluid is held by the ferromagnetic field to prevent an outward flow of the magnetic fluid as the operating oil. At this time, as a magnet for forming the ferromagnetic field, a nylon-based neodymium magnet, a samarium-cobalt magnet, a ferrite magnet, or the like is generally used.

In both cases of using the lubricating oil and of using the magnetic fluid as the operating oil, a lipophobic agent is applied on the surfaces of members which are disposed in the vicinity of the boundary surface between the fluid and the external space to prevent the exudation thereof, thereby preventing the outward flow of the fluid. This is because a liquid on a metal surface with no lipophobic agent applied thereon causes an exudation phenomenon, and a part where the exudation phenomenon occurs serves as a passage through which the fluid leaks out, and a centrifugal force or the like further promotes the outward dispersion of the operating oil through the passage. Therefore, the prevention of the exudation of the operating oil is an important technique for the dynamic pressure bearing device which uses a liquid as the operating oil, and the lipophobic agent to be applied needs to adhere well to the metal surface, undergo small secular changes, and stably and continuously exert the function thereof.

Incidentally, the conventional dynamic pressure bearing device has the following disadvantages. Namely, as described above, the gap between the rotating portion and the fixed portion at the time when the rotating shaft is supported in the levitated state by the dynamic pressure bearing portion is generally set to about 2 $\mu$m to about 3 $\mu$m in the conventional dynamic pressure bearing device applied to the miniature motor such as the spindle motor for the HDD, and in this case, the variation in the gap has to be controlled to be ±several tenths $\mu$m or less in order to reduce variation in precision, a levitating force, power consumption, and so on of the rotating shaft. Therefore, it is necessary to demand a high precision for the dimension of each constituent member of the dynamic pressure bearing device.

Constituent members of the journal bearing portion are relatively easily manufactured since only the precision enhancement of the inner and outer diameters is what is required for these members, but since constituent members of especially the thrust bearing portion require variation reduction in height, it is very difficult to secure a required dimension precision for these constituent members in view of the precision of parts which is obtained by ordinary metal machining. Therefore, there exists a problem that this will be a cause of increasing the price of the dynamic pressure bearing device and a cause of preventing the dynamic pressure bearing device from being in wide use.

Moreover, the adhesive is used to fix the constituent parts due to the lack of space in the conventional dynamic pressure bearing device which is applied to the miniature motor such as the spindle motor for the HDD, as described above. However, since it is difficult to control the variation in thickness of the solidified adhesive to be small, there exists a disadvantage that it is difficult to control the variation in the gap in the dynamic pressure bearing portion, especially in the thrust bearing portion to be small.

Further, the magnetic fluid is used as the operating oil in order to prevent the fluid which is filled in the gap in the dynamic pressure bearing portion from flowing and dispersing to the external space in the conventional dynamic pressure bearing device as described above. However, the viscosity of the magnetic fluid which is made by dispersing metal particulates in a colloidal state into a lubricating oil using a surface active agent is generally high compared with the lubricating oil. This will lead to the increase in power consumption for rotating the rotating shaft, and since self-heating occurs in the magnetic fluid due to a shear received by the magnetic fluid in accordance with the rotation of the rotating shaft in the dynamic pressure bearing portion to promote oxidation or evaporation of the fluid, there exists a disadvantage that the life of the dynamic pressure bearing device using the magnetic fluid is short compared with that using the lubricating oil.

Moreover, when the magnetic fluid is used as the operating oil of the dynamic pressure bearing device, the nylon-based neodymium magnet, the samarium-cobalt magnet, the ferrite magnet, or the like is conventionally used as the magnet for forming the ferromagnetic field in the vicinity of the boundary surface between the magnetic fluid and the external space, as described above. However, the particle diameter of any of these magnets is 0.8 mm or more so that it is impossible to set the thickness or the difference between the inner and outer radius thereof to 0.5 mm or less. Therefore, since space for arranging these magnets cannot be secured in the dynamic pressure bearing device of the spindle motor for the disk-rotating-type memory which uses a disk with an outer diameter of, for example, 1.5 inches or less, it is difficult to manufacture a dynamic pressure bearing device which can constitute a microminiature spindle motor.

As described above, in the conventional dynamic pressure bearing device using the lubricating oil or the magnetic fluid as the operating oil, the lipophobic agent is applied on the constituent members of the device arranged in the vicinity of the boundary surface between the operating oil which is filled in the gap in the dynamic pressure bearing portion and the external space to prevent the outward exudation of the operating oil. However, the members on which this lipophobic agent is applied are made of metal to necessitate the application of the lipophobic agent on machined surfaces thereof. Incidentally, in metal machining, a cutting oil is generally used, and at this time, since a metal surface newly appearing as a result of working with a cutting tool is active, this metal surface is immediately bound with the cutting oil. Then, the cutting oil thus bound with the metal surface remains on the metal surface in a molecular level thickness and is not easily removed or exfoliated by chemical washing or the like. Accordingly, when the lipophobic agent is applied on the metal surface with which the cutting oil is bound, such a problem is caused that the lipophobic property is greatly lowered since adhesion between the lipophobic agent and the metal surface is low to easily cause the exfoliation of the lipophobic agent.

SUMMARY OF THE INVENTION

It is an object of the present invention to provide a dynamic pressure bearing device which not only can be miniaturized and is highly precise but also can be manufactured easily and at low cost, and to provide a manufacturing method and an assembly jig thereof.

According to one of the aspects of the present invention, it is a dynamic pressure bearing device which is characterized in that it comprises: a rotating portion including a rotating shaft member disposed at a rotation center and a first ring-shaped member and a second ring-shaped member which are fixedly fitted to an outer peripheral surface of this rotating shaft member; a fixed portion including an intermediate member disposed between the first ring-shaped member and the second ring-shaped member and rotatably supporting the rotating portion; a thrust bearing portion including respective facing surfaces of the first ring-shaped member and the intermediate member, an operating oil for dynamic pressure generation filled in a first gap formed between these facing surfaces, respective facing surfaces of the second ring-shaped member and the intermediate member, and an operating oil for dynamic pressure generation filled in a second gap formed between these facing surfaces; and a journal bearing portion including an outer peripheral surface of the rotating portion and an inner peripheral surface of the intermediate member which face each other, and an operating oil for dynamic pressure generation filled in a third gap formed between these facing surfaces, the first and second ring-shaped members being fixed to the rotating shaft member only with an adhesive which is applied on surfaces to be fitted to the rotating shaft member.

Here, 'the outer peripheral surface of the rotating portion' constituting the journal bearing portion includes, besides an outer peripheral surface of the rotating shaft member (for example, in the case of FIG. 2 which will be described later, or the like), outer peripheral surfaces of a spacer and a metal leaf which rotate along with the rotating shaft member while being fitted to the rotating shaft member and sandwiched by the first ring-shaped member and the second ring-shaped member (for example, in the case of FIG. 13 which will be described later, and the like). However, the former case in which it is the outer peripheral surface of the rotating shaft member is preferable from the viewpoint that the shaft diameter of the rotating shaft member can be made large or the device can be miniaturized.

In the present invention as described above, the total value of the width dimensions of the two-layered gaps constituting the thrust bearing portion is determined by the arrangement gap between the first ring-shaped member and the second ring-shaped member. Specifically, this total value equals a value of the distance between the facing surfaces of the first ring-shaped member and the second ring-shaped member from which the thickness dimension of the intermediate member is subtracted. In this case, the first and second ring-shaped members are both fixed to the rotating shaft member only with the adhesive which is applied on the surfaces thereof to be fitted to the rotating shaft member, thereby determining the arrangement gap between these members. Therefore, an adhesive layer (a layer spreading along surfaces orthogonal to the axis of the rotating shaft member) formed by the solidification of the adhesive applied for bonding the members together is not formed between the first ring-shaped member and the second ring-shaped member due to the structure of the rotating portion.

This allows the arrangement gap between the first ring-shaped member and the second ring-shaped member to be irrelevant to the thickness of the adhesive layer, and since such a situation is avoidable that the arrangement gap between the first ring-shaped member and the second ring-shaped member cannot be set to a predetermined value due to the influence of the variation in the thickness of the adhesive layer, the gaps in the thrust bearing portion can be set to the predetermined values. Therefore, a miniature and high-precision dynamic pressure bearing device can be realized.

Further, as the adhesive used for assembling the dynamic pressure bearing device, an anaerobic adhesive suitable under the condition of the strength and the solidification, and so on is generally used. Since the cubical expansion accompanies with the solidification of this adhesive, a higher adhesion strength is obtained when this adhesive is applied on the surfaces of the members which are fitted to each other (an outer peripheral surface of one of the members and an inner peripheral surface of the other member which are to be fitted to each other), compared with the case when this adhesive is applied on end surfaces of the members (surfaces orthogonal to the axis of the rotating shaft member). Therefore, a dynamic pressure bearing device resistant to externally given shocks and vibrations can be realized.

Moreover, in order to form the gaps having the predetermined width dimensions in the thrust bearing portion, high-precision working for forming a stepped part and high-precision thickness-wise working are not necessary, but what is necessary is only fixing the first ring-shaped member and the second ring-shaped member by setting the arrangement gap therebetween to the predetermined value. Therefore, easy and low-cost manufacturing of the dynamic pressure bearing device is made possible without being accompanied by difficult machining.

In the aforesaid dynamic pressure bearing device, the distance between the facing surfaces of the first ring-shaped member and the second ring-shaped member preferably equals the total value of the thickness dimension of the intermediate member and the thickness dimension of the metal leaf as an assembly jig.

Here, the metal leaf as an assembly jig may be constituted of one metal leaf or may be constituted by stacking the plural metal leaves. However, in view of simplification of manufacturing processes and enhancement of product precision, the structure constituted of one metal leaf is preferable. As the metal leaf, one having a thickness of, for example, about 4 μm to about 8 μm can be suitably used.

When the distance between the facing surfaces of the first ring-shaped member and the second ring-shaped member is thus defined by using the metal leaf as an assembly jig (for example, the cases of FIG. 4 and FIG. 5 which will be described later and the like), the gaps having desired width dimensions can be easily formed in the thrust bearing portion by utilizing the thickness of the metal leaf.

According to another aspect of the present invention, it is a dynamic pressure bearing device which is characterized in that it comprises: a rotating portion including a rotating shaft member disposed at a rotation center and a ring-shaped member fixedly fitted to an outer peripheral surface of this rotating shaft member; a fixed portion including a first member disposed on one end surface side of the ring-shaped member in terms of a thickness direction and a second member disposed on the other end surface side: a thrust bearing portion including respective facing surfaces of the ring-shaped member and the first member, an operating oil for dynamic pressure generation filled in a first gap formed between these facing surfaces, respective facing surfaces of the ring-shaped member and the second member, and an operating oil for dynamic pressure generation filled in a second gap formed between these facing surfaces; a journal bearing portion including respective facing surfaces of the first member and/or the second member and the rotating shaft member, and an operating oil for dynamic pressure generation which is filled in a third gap formed between these facing surfaces; a spacer, which is disposed between the first member and the second member on an outer periphery side of the ring-shaped member, having an equal thickness to that of the ring-shaped member; and a metal leaf, which is disposed between the first member and the second member on the outer periphery side of the ring-shaped member, having a thickness corresponding to a total value of width dimensions of the first and second gaps, the spacer and the metal leaf having front and rear surfaces with no adhesive being applied thereon.

Here, the metal leaf may be constituted of one metal leaf, or may be constituted by stacking the plural metal leaves. However, in view of simplification of manufacturing processes and enhancement of product precision, the structure constituted of one metal leaf is preferable. Note that the metal leaf here means the metal leaf not as an assembly jig but as a constituent member of the dynamic pressure bearing device. As the metal leaf, one having a thickness of, for example, about 4 μm to about 8 μm can be suitably used.

The spacer having the same thickness as that of the ring-shaped member is preferably formed in the same lot (the same work process) as that of the ring-shaped member.

In the present invention as described above, since the adhesive is not applied on the respective front and rear surfaces of the spacer and the metal leaf which are sandwiched between the first member and the second member, a solidified adhesive layer (a layer spreading along surfaces orthogonal to the axis of the rotating shaft member) is not formed between the first member and the second member due to the structure of the fixed portion. Therefore, the distance between the facing surfaces of the first member and the second member equals the total value of the thickness dimension of the spacer and the thickness dimension of the metal leaf.

This means that the total value of the width dimensions of the two-layered gaps constituting the thrust shaft portion is obtained based on the thickness dimension of the metal leaf. The thickness of the metal leaf is generally so controlled that the variation thereof is ±0.5 μm or less, thereby securing a sufficient precision for forming the gaps with desired width dimensions. Therefore, a miniature and high-precision dynamic pressure bearing device can be realized.

Further, since the use of the metal leaf as a constituent member enables the formation of the gaps having the predetermined width dimensions, high-precision working for forming a stepped portion and high-precision thickness-wise working are not required. Therefore, the dynamic pressure bearing device can be manufactured easily and at low cost without being accompanied by difficult machining.

Moreover, the total value of the width dimensions of the two-layered gaps constituting the thrust bearing portion is secured by the thickness dimension of the metal leaf provided that the spacer has the same thickness as that of the ring-shaped member. Hence, even when the precision in the dimensions of the spacer and the ring-shaped member in a thrust direction is lowered, the thrust bearing portion having the high-precision gaps can be formed provided that the thickness of these spacer and the thickness of the ring-shaped member are made equal by, for example, manufacturing these members in the same lot. Therefore, the dynamic pressure bearing device can be manufactured at low cost also from this point of view.

According to still another aspect of the present invention, it is a dynamic pressure bearing device which is characterized in that it comprises: a fixed portion; a rotating portion supported rotatably by this fixed portion; and a dynamic pressure bearing portion including respective facing surfaces of the fixed portion and the rotating portion and an operating oil for dynamic pressure generation filled in a gap formed between these facing surfaces, for allowing the rotating portion to be rotatably supported by the fixed portion, and that a ferromagnetic field is formed in a vicinity of a boundary surface between the operating oil constituting the dynamic pressure bearing portion and an external space, and in the vicinity of the boundary surface, a first magnetic fluid supportable by the ferromagnetic field is disposed as the operating oil, while in a portion other than the vicinity of the boundary surface, a second magnetic fluid having a lower concentration than that of the first magnetic fluid is disposed as the operating oil.

Here, as the first magnetic fluid, a magnetic fluid of, for example, about 100 gausses to about 200 gausses, which is sufficient for the first magnetic fluid to be held by the ferromagnetic field, can be suitably used. Meanwhile, as the second magnetic fluid, a magnetic fluid having a low concentration whose saturation magnetization is, for example, as close to that of an ordinary lubricating oil as possible, that is, about 10 gausses to about 30 gausses (the metal particulate content is about one fourth of a magnetic fluid with the saturation magnetization of 200 gausses) can be suitably used.

In the present invention as described above, since the second magnetic fluid having a lower concentration than that of the first magnetic fluid is disposed in the portion other than the vicinity of the boundary surface between the operating oil constituting the dynamic pressure bearing portion and the external space, the life of the dynamic pressure bearing device can be elongated compared with the case when the entire operating oil is constituted of the first magnetic fluid. In other words, though the use of the magnetic fluid as the operating oil by filling it in an extremely small gap of, for example, 2 $\mu$m to 3 $\mu$m gives rise to a disadvantage of shortening the life of the dynamic pressure bearing device since a magnetic fluid has a high viscosity compared with a lubricating oil, such a disadvantage is eliminated or alleviated.

Further, since the first magnetic fluid is disposed in the vicinity of the boundary surface between the operating oil constituting the dynamic pressure bearing portion and the external space, the operating oil is prevented from flowing out. At this time, since the vicinity of the boundary surface generally has a relatively large gap formed therein, which is, for example, 30 $\mu$m or larger, the influence of a shear due to the rotation is small. Therefore, no such disadvantage occurs that the life of the dynamic pressure bearing device is shortened due to the influence of the first magnetic fluid which is disposed in the vicinity of the boundary surface.

Further, when the ordinary lubricating oil is used in the portion other than the vicinity of the boundary surface between the operating oil constituting the dynamic pressure bearing portion and the external space and the magnetic fluid is used only in the vicinity of the boundary surface, the metal particulates of the magnetic fluid are generally dispersed into the ordinary lubricating oil during the rotation to disable the magnetic fluid from maintaining a concentration as the magnetic fluid required for holding the operating oil. In contrast, when the second magnetic fluid with the low concentration is used in the portion other than the vicinity of the boundary surface as in the present invention, the first magnetic fluid in the vicinity of the boundary surface is not dispersed so that the operating oil is prevented from flowing out.

Moreover, since the first magnetic fluid is disposed in the vicinity of the boundary surface, static electricity on a disk generated during the rotation of the disk can be grounded via this first magnetic fluid. In other words, conductivity sufficient for preventing the destruction of a head caused by the static electricity can be maintained, thereby achieving the aforesaid object.

In the aforesaid dynamic pressure bearing device, it is preferable that the magnet member which is formed by blending samarium, iron, and nitrogen is used to form the ferromagnetic field. Here, the magnet member formed by blending samarium, iron, and nitrogen (Sm—Fe—N magnet) is a bond magnet which has been developed recently with the aim of making a thin and small magnet, and the particle diameter thereof is, for example, about 5 $\mu$m. Even when the size of the magnet member is, for example, about 6.5 mm in outer diameter, about 5 mm in inner diameter, and about 0.4 mm in thickness, it is fully durable for use.

When the Sm—Fe—N magnet is thus used to form the ferromagnetic field, the magnet can be miniaturized, and accordingly, the dynamic pressure bearing device can be miniaturized.

According to yet another aspect of the present invention, it is a dynamic pressure bearing device manufacturing method for manufacturing the aforesaid dynamic pressure bearing device comprising the first and second ring-shaped members and the intermediate member, the method characterized in that it comprises: preparing a flat surface on which an assembly work is to be carried out and a metal leaf having a thickness corresponding to a total value of width dimensions of the first and second gaps; first, mounting the rotating shaft member on the flat surface with a lower end surface of the rotating shaft member being in contact with the flat surface while arranging the metal leaf, the second ring-shaped member, the intermediate member, and the first ring-shaped member in tiers in this order around the rotating shaft member, and in this state, fixing the first ring-shaped member to the rotating shaft member by using the adhesive applied on the surface, which is to be fitted to the rotating shaft member, of the first ring-shaped member; and subsequently, after separating the rotating shaft member away from the flat surface to remove the metal leaf, mounting the rotating shaft member again on the flat surface with the lower end surface of the rotating shaft member being in contact with the flat surface while moving the second ring-shaped member and the intermediate member along an axial direction of the rotating shaft member to bring the second ring-shaped member into contact with the flat surface, and fixing, in this state, the second ring-shaped member to the rotating shaft member by using an adhesive applied on a surface, which is to be fitted to the rotating shaft member, of the second ring-shaped member. Note that the metal leaf here is a metal leaf as an assembly jig and not a metal leaf as a constituent member of the dynamic pressure bearing device.

In the present invention as described above, since the arrangement gap between the first ring-shaped member and the second ring-shaped member can be thus defined by using the metal leaf as an assembly jig, the gaps having desired width dimensions can be easily formed in the thrust bearing portion by utilizing the thickness of the metal leaf.

According to yet another aspect of the present invention, it is a dynamic pressure bearing device manufacturing method for manufacturing a dynamic pressure bearing device which comprises: a fixed portion; and a rotating portion supported rotatably by this fixed portion via a dynamic pressure bearing portion, the dynamic pressure bearing portion comprising respective facing surfaces of the fixed portion and the rotating portion, and an operating oil for dynamic pressure generation filled in a gap which is formed between these facing surfaces, the method characterized in that a lipophobic agent is used instead of a cutting agent for machining in machining at least a member arranged in a vicinity of a boundary surface between the operating oil constituting the dynamic pressure bearing portion and an external space out of members constituting the dynamic pressure bearing device.

In the present invention as described above, since the lipophobic agent is used instead of the cutting agent for machining, such a disadvantage is eliminated that the cutting agent is bound with the metal surface at the machining to deteriorate performance of the lipophobic agent to be applied thereafter, and consequently, the operating oil is prevented from flowing out the external space due to the exudation thereof.

The use of the lipophobic agent instead of the cutting agent for machining causes an active metal surface appearing on a new surface during he machining to be bound immediately with the lipophobic agent. The lipophobic agent thus bound with the metal surface is not easily removed even by washing and the effect thereof is increased by further applying the lipophobic agent.

The major roles of the cutting agent at the metal working are to eliminate heat generation at the time of the working, to prevent adhesion between a cutting tool and the metal which is a workpiece to be worked, and so on, and though the use of the lipophobic agent instead of the cutting oil lowers the achievement degree of these objects to degrade the cutting property to a small extent compared with the case when the ordinary cutting oil is used, the effect of the lipophobic agent lasts so that the effect thereof is greatly exerted in subsequent processes.

According to yet another aspect of the present invention, it is a dynamic pressure bearing device manufacturing method for manufacturing a dynamic pressure bearing device which comprises: a fixed portion; and a rotating portion supported rotatably by this fixed portion via a dynamic pressure bearing portion, the dynamic pressure bearing portion comprising respective facing surfaces of the fixed portion and the rotating portion, and an operating oil for dynamic pressure generation filled in a gap formed between these facing surfaces, the method characterized in that, when at least a member arranged in a vicinity of a boundary surface between the operating oil constituting the dynamic pressure bearing portion and an external space out of members constituting the dynamic pressure bearing device is worked and finished, this member is machined using a cutting agent for machining, thereafter, undergoes dry machining without using the cutting agent to remove the cutting agent remaining on a surface of the member, and thereafter, a lipophobic agent is applied on this surface.

Here, as the dry machining without using the cutting agent, for example, working with an abrasive paper (a sandpaper) or a grindstone, working with a turning tool instead of the cutting agent, or the like is available.

In the present invention as described above, the lipophobic agent is applied after the cutting agent bound with the metal surface at the machining is removed by the dry machining so that adhesiveness between the metal surface and the lipophobic agent can be strengthened, which makes it possible to prevent the operating oil from flowing out to the external space due to the exudation thereof.

According to yet another aspect of the present invention, it is a dynamic pressure bearing device manufacturing method for manufacturing a dynamic pressure bearing device which comprises: a fixed portion; and a rotating portion supported rotatably by this fixed portion via a dynamic pressure bearing portion, the dynamic pressure bearing portion comprising respective facing surfaces of the fixed portion and the rotating portion, and an operating oil for dynamic pressure generation filled in a gap formed between these facing surfaces, the method characterized in that, when at least a member arranged in a vicinity of a boundary surface between the operating oil constituting the dynamic pressure bearing portion and an external space out of members constituting the dynamic pressure bearing device is worked and finished, this member is machined using a cutting agent for machining, and thereafter, the lipophobic agent is applied while the cutting agent remaining on the surface of the member is removed, by using a surface treating material capable of polishing or cutting a surface of a metallic member and retaining a lipophobic agent abundantly.

Here, as the surface treating material capable of polishing or cutting the surface of a metallic member and retaining the lipophobic agent abundantly, for example, a sponge abrasive, a pad abrasive, an unwoven fabric surface treating material, and so on can be suitably used.

In the present invention as described above, the surface treating material capable of polishing or cutting the surface of a metallic member and retaining the lipophobic agent abundantly is used so that the removal of the cutting agent remaining on the surface of the member and the application of the lipophobic agent can be carried out at the same time. This can strengthen the adhesiveness between the metal surface and the lipophobic agent, thereby enabling the prevention of the operating oil from flowing out to the external space due to the exudation thereof.

According to yet another aspect of the present invention, it is a dynamic pressure bearing device manufacturing method for manufacturing a dynamic pressure bearing device which comprises: a fixed portion; and a rotating portion supported rotatably by this fixed portion via a dynamic pressure bearing portion, the dynamic pressure bearing portion comprising respective facing surfaces of the fixed portion and the rotating portion, and an operating oil for dynamic pressure generation filled in a gap formed between these facing surfaces, the method characterized in that, when at least a member arranged in a vicinity of a boundary surface between the operating oil constituting the dynamic pressure bearing portion and an external space out of members constituting the dynamic pressure bearing device is worked and finished, this member is machined using a cutting agent for machining, thereafter, an ozone gas is blown to this member to remove the cutting agent remaining on a surface of the member, and thereafter, a lipophobic agent is applied on this surface.

In the present invention as described above, the ozone gas is blown to remove the cutting agent remaining on the surface of the member so that the remaining cutting agent can be removed smoothly. Thereafter, the lipophobic agent is applied so that the adhesiveness between the metal surface and the lipophobic agent can be strengthened, which makes it possible to prevent the operating oil from flowing out to the external space due to the exudation thereof.

According to yet another aspect of the present invention, it is a dynamic pressure bearing device manufacturing method for manufacturing the aforesaid dynamic pressure bearing device comprising the first and second ring-shaped members and the intermediate member, the method characterized in that it comprises: preparing a flat surface on which an assembly work is to be carried out and a metal leaf as an assembly jig having a thickness corresponding to a total value of width dimensions of the first and second gaps; first, mounting a rotating shaft member on the flat surface with a lower end surface of the rotating shaft member being in contact with the flat surface while arranging the second ring-shaped member around the rotating shaft member to be in contact with the flat surface, and in this state, fixing the second ring-shaped member to the rotating shaft member by using the adhesive applied on the surface, which is to be fitted to the rotating shaft member, of the second ring-shaped member while applying a downward pressure to the second ring-shaped member; subsequently, arranging the intermediate member and the metal leaf in tiers above the second ring-shaped member, further stacking the first ring-shaped member above the intermediate member and the metal leaf, and in this state, while applying a downward pressure to the first ring-shaped member, fixing the first ring-shaped member to the rotating shaft member by using the adhesive applied on the surface, which is to be fitted to the rotating shaft member, of the first ring-shaped member; and thereafter, pulling out the metal leaf.

Here, the 'metal leaf as the assembly jig' may be constituted of one metal leaf, or may be constituted by stacking the plural metal leaves. However, in view of simplification of manufacturing processes and enhancement of product precision, the structure constituted of one metal leaf is preferable. As the metal leaf, one having a thickness of, for example, about 3 $\mu$m to about 5 $\mu$m can be suitably used.

When 'arranging the intermediate member and the metal leaf in tiers above the second ring-shaped member', the intermediate member and the metal leaf (one piece or a plurality of pieces) may be tiered in this order from a lower side, or reversely, the metal leaf (one piece or a plurality of pieces) and the intermediate member may be tiered in this order, or the metal leaf (one piece or a plurality of pieces), the intermediate member, the metal leaf (one piece or a plurality of pieces) may be tiered in this order to arrange the metal leaves above and under the intermediate member.

When 'fixing the second ring-shaped member to the rotating shaft member by using the adhesive applied on the surface, which is to be fitted to the rotating shaft member, of the second ring-shaped member while applying a downward pressure to the second ring-shaped member', the pressure may be applied directly to the second ring-shaped member from the assembly jig or the pressure may be applied to the second ring-shaped member via the intermediate member and/or the metal leaf which are tiered above the second ring-shaped member. Therefore, the phrase 'arranging the intermediate member and the metal leaf in tiers above the second ring-shaped member, further stacking the first ring-shaped member above the intermediate member and the metal leaf, and in this state, while applying a downward pressure to the first ring-shaped member' is intended to mean that such an arrangement is what is necessary when the downward pressure is applied to the first ring-shaped member, and the timing when the intermediate member and the metal leaf are arranged in tiers above the second ring-shaped member is not limited to after the downward pressure is applied to the ring-shaped member, but may be before the downward pressure is applied to the second ring-shaped member. In view of enhancing product precision, however, it is preferable that the intermediate member and the metal leaf are arranged in tiers above the second ring-shaped member after the pressure is directly applied to the second ring-shaped member from the assembly jig.

In the manufacturing method according the present invention as described above, the arrangement gap between the first ring-shaped member and the second ring-shaped member can be defined by using the metal leaf as an assembly jig so that the gaps having desired width dimensions can be easily formed in the thrust bearing portion by utilizing the thickness of the metal leaf. The thickness of the metal leaf is generally so controlled that variation thereof is ±0.1 $\mu$m or less, which is a sufficient precision to form the gaps having desired width dimensions, and therefore a miniature and high-precision dynamic pressure bearing device can be manufactured at low cost.

Since, after the second ring-shaped member is fixed to the rotating shaft member, the first ring-shaped member is fixed to the rotating shaft member while the first ring-shaped member is pressed toward the second ring-shaped member with the intermediate member and the metal leaf being sandwiched between the first ring-shaped member and the second ring-shaped member, the gap corresponding to the thickness of the metal leaf can be directly formed by pulling out the metal leaf thereafter, which makes it possible to enhance product precision. To detail further, in the aforesaid manufacturing method already proposed in Japanese Patent Application No. 2001-148153 by the present applicant, the rotating shaft member is first mounted on the flat surface with the lower end surface of the rotating shaft member being in contact with the flat surface while the metal leaf, the second ring-shaped member, the intermediate member, and the first ring-shaped member are arranged in tiers in this order around the rotating shaft member, and in this state, the first ring-shaped member is fixed to the rotating shaft member by using an adhesive applied on the surface, which is to be fitted to the rotating shaft member, of the first ring-shaped member; subsequently, after the rotating shaft member is separated from the flat surface to remove the metal leaf, the rotating shaft member is again mounted on the flat surface with the lower end surface of the rotating shaft member being in contact with the flat surface while the second ring-shaped member and the intermediate member are moved along the axial direction of the rotating shaft member to bring the second ring-shaped member into contact with the flat surface, thereby fixing the rotating shaft member in this state by using an adhesive applied on the surface, which is to be fitted to the second ring-shaped member, of the rotating shaft member. In this manufacturing method, however, the force to press the first ring-shaped member and the second ring-shaped member against each other does not act in the state in which the metal leaf is sandwiched between the first ring-shaped member and the second ring-shaped member. On the other hand, in the manufacturing method of the present invention, since the pressing force acts in the state in which the metal leaf is sandwiched between the first ring-shaped member and the second ring-shaped member, the gap corresponding to the thickness of the metal leaf can be formed more reliably.

According to yet another aspect of the present invention, it is a dynamic pressure bearing device manufacturing method for manufacturing the aforesaid dynamic pressure bearing device which comprises the first and second ring-shaped members and the intermediate member, the method characterized in that it comprises: preparing a flat surface on which an assembly work is to be carried out, a metal leaf as an assembly jig having a thickness corresponding to a total value of width dimensions of the first and second gaps, and a right angle setting member as an assembly jig having two parallel surfaces; first, mounting the rotating shaft member on the flat surface with a lower end surface of the rotating shaft member being in contact with the flat surface; arranging the right angle setting member around the rotating shaft member with one of the two surfaces thereof being in contact with the flat surface and further stacking the first ring-shaped member above the right angle setting member; in this state, fixing the first ring-shaped member to the rotating shaft member by using the adhesive applied on the surface, which is to be fitted to the rotating shaft member, of the first ring-shaped member while applying a downward pressure to the first ring-shaped member; subsequently, after removing the right angle setting member, arranging the second ring-shaped member in a space formed by removing the right angle setting member so as to be in contact with the flat surface, and further arranging the intermediate member and the metal leaf in tiers above the second ring-shaped member, and in this state, fixing the second ring-shaped member to the rotating shaft member by using the adhesive applied on the surface, which is to be fitted to the rotating shaft member, of the second ring-shaped member while applying a downward pressure to the first ring-shaped member; and thereafter, pulling out the metal leaf.

Here, 'the right angle setting member' need not be constituted of one member but may be constituted by stacking a plurality of members, but in view of enhancing product precision and facilitating an assembly work, it is preferably constituted of one member.

In the manufacturing method of the present invention as described above (the invention in which the first ring-shaped member is first fixed), since the arrangement gap between the first ring-shaped member and the second ring-shaped member can be defined using the metal leaf as an assembly jig, similarly to the aforesaid invention (the invention in which the second ring-shaped member is first fixed), the gaps having desired width dimensions can be easily formed in the thrust bearing portion by utilizing the thickness of the metal leaf. The thickness of the metal leaf is generally so controlled that variation thereof is ±0.1 μm or less, which is a sufficient precision to form the gap having a desired width dimension, and therefore a miniature and high-precision dynamic pressure bearing device can be manufactured at low cost.

Moreover, since, after the first ring-shaped member is fixed to the rotating shaft member, the second ring-shaped member is fixed to the rotating shaft member while the first ring-shaped member is pressed toward the second ring-shaped member with the intermediate member and the metal leaf being sandwiched between the first ring-shaped member and the second ring-shaped member, the gap corresponding to the thickness of the metal leaf can be directly formed by pulling the metal leaf out thereafter, which makes it possible to enhance product precision, similarly to the case of the aforesaid invention (the invention in which the second ring-shaped member is first fixed).

According to yet another aspect of the present invention, it is an assembly jig of a dynamic pressure bearing device used in assembling a dynamic pressure bearing device which comprises a fixed portion and a rotating portion supported rotatably by this fixed portion via a dynamic pressure bearing portion, and in which the rotating portion comprises a rotating shaft member disposed at a rotation center, the assembly jig characterized in that it comprises: an abutting portion side member disposed on an abutting portion side abutting on a pressed member; a pressure source side member disposed closer to a pressure source side than this abutting portion side member and capable of changing the position thereof relative to this abutting portion side member; and a resilient member sandwiched between the abutting portion side member and the pressure source side member, the resilient member being disposed on an outer periphery side of the rotating shaft member or a prolonged position of the rotating shaft member in a state of surrounding the rotating shaft member or the prolonged position, and the abutting portion side member including a rotating shaft member inserting portion into which the rotating shaft member is to be inserted.

Here, 'a state of surrounding the rotating shaft member or a prolonged position of the rotating shaft member' includes not only the state in which the entire direction covering 360 degrees is completely surrounded by the resilient member but also, for example, the state in which the plural resilient members are arranged at equal spaced intervals around the rotating shaft member or the prolonged position thereof, and the like. As the latter state, the case where the plural resilient members having, for example, a spherical shape, an egg shape, or the like are arranged at equal spaced intervals on the periphery, or the like is included. In view of simplification of the structure of the assembly jig, reduction in production cost, and so on, however, it is preferable that the entire direction covering 360 degrees is completely surrounded by the resilient member.

The 'pressure source' is a pressure generating means, and includes, for example, a vise, a cylinder device, a press machine, and so on.

The 'rotating shaft member inserting portion' may be a through hole which passes through the abutting portion side member from the front surface to the rear surface thereof or may be a hole portion which does not pass therethrough from the front surface to the rear surface, The 'pressed member' means a constituent member of the dynamic pressure bearing device, which is an object to be pressed when the dynamic pressure bearing device is assembled. For example, in carrying out the aforesaid manufacturing method of the present invention (may be the invention in which the first ring-shaped member is first fixed or may be the invention in which the second ring-shaped member is first fixed), in which the first and second member are fixed to the rotating shaft member with the adhesive while being pressed, the first and second ring-shaped member at this time correspond to the pressed members.

Each of the 'abutting portion side member' and the 'pressure source side member' may be constituted of one member, or may be constituted of a plurality members which are stacked, fitted to each other, or the like. Further, when it is constituted of a plurality of members, these members need not be integrated and may be separable.

In the assembly jig of the present invention as described above, when the constituent member of the dynamic pressure bearing device is pressed at the time of the assembly, the pressure generated by the pressure source is transmitted to the abutting portion side member from the pressure source side member via the resilient member to be applied to the pressed member. At this time, even when respective facing surfaces of the pressure source side member and the abutting portion side member are not parallel to each other, since the resilient member is disposed on the outer periphery side of the rotating shaft member or the prolonged position thereof in the state of surrounding the rotating shaft member or the prolonged position thereof, the compression degrees at respective positions of the resilient member are different among the respective positions to absorb the influence of this unparallel state, so that the pressure from the pressure source side member is transmitted evenly to respective positions of the abutting portion side member.

Consequently, the pressure can be applied evenly to a pressed surface of the pressed member, in other words, to each direction with respect to the rotating shaft member or the prolonged position thereof, which enhances assembly precision of the dynamic pressure bearing device, thereby enabling the manufacture of a high-precision product.

It is also preferable that the resilient member is a closed ring-shaped resilient member in such an assembly jig of the dynamic pressure bearing device.

Here, the 'closed ring-shaped' means that the shape seen in the direction along the rotating shaft member is closed ring shaped. The resilient member preferably is in a circular ring shape in view of the fact that pressed members are mostly formed in a circular shape and that the pressure can be made even most easily, but may be in a different shape such as an elliptic ring shape, a substantially quadrilateral (substantially square and substantially rectangular) ring shape, a substantially polygonal (including substantially regular polygonal) ring shape, or the like.

In the case of the structure using such a resilient member in a closed ring shape, since the resilient member covers the entire direction (the entire direction covering 360 degrees) with respect to the rotating shaft member or the prolonged position owing to its closed ring shape, the pressure can be made even with more reliability, thereby enabling further enhancement of product precision. Moreover, since only one member needs to be disposed owing to its closed ring shape, the structure of the assembly jig can be simplified and production cost can be reduced compared with the case, for example, where the plural resilient members are arranged at equal spaced intervals around the rotating shaft member or the prolonged position thereof, and the like.

Further, in the case of the structure using the above-described resilient member in the closed ring shape, the resilient member in the closed ring shape is preferably an O-ring.

Here, as a material of the O-ring, for example, a nitrile rubber or the like can be suitably used, and in addition, various kinds of materials are usable such as a styrene rubber, a silicon rubber, a fluorine rubber, an acrylic rubber, an ethylene propylen rubber, a nitrile hydride rubber, an urethane rubber, and so on, and the material may be selected appropriately according to the kind of the pressed member.

The O-ring may be adhesively bonded to the pressure source side member and/or the abutting portion side member, but it is preferably made separable from the pressure source side member and the abutting portion side member since adhesive bonding lowers the function of the O-ring.

In the case of the structure using such an O-ring, since the resilient range is wide owing to the circular cross section of the O-ring (it is not the shape seen in the direction along the rotating shaft member, but is the shape of a vertical cross section), substantially the same pressure is applied to the each position of the abutting portion side member even when the degree of the compression of the O-ring is different at each position. Consequently, even when the pressure is applied in the state in which the facing surfaces of the pressure source side member and the abutting portion side member are not parallel to each other, the pressure from the pressure source side member can be transmitted further evenly to each position of the abutting portion side member. As a result, the pressure can be applied further evenly to the pressed surface of the pressed member, thereby further enhancing assembly precision of the dynamic pressure bearing device, which makes it possible to manufacture a higher-precision product.

Further, the assembly work is facilitated since the O-ring is made of rubber and is not slippery.

Moreover, since the O-ring, which is intended for use as, for example, a vacuum seal and the like, has a characteristic of pressing a surface evenly, the use of the O-ring makes it possible to easily secure a function of pressing a surface evenly.

Further, since a commercially available O-ring is usable, it is available at a low price, which enables reduction in equipment cost, and in addition, since O-rings of various materials are commercially available, selection according to the intended use is possible.

Moreover, since the O-ring is intended for use, for example, as a vacuum seal and the like, the surface thereof is dense. Therefore, dust and so on do not easily adhere thereto and it does not generate dirt, and in addition, can be washed easily.

In the aforesaid manufacturing methods of the dynamic pressure bearing device of the present invention (the invention in which the first ring-shaped member is first fixed and the invention in which the second ring-shaped member is first fixed), it is preferable to use the assembly jig as described above of the dynamic pressure bearing device when the downward pressure is applied to the first or the second ring-shaped member.

When the assembly jig as described above is thus used in carrying out the aforesaid manufacturing methods of the dynamic pressure bearing device of the present invention, the pressure can be applied evenly to the first or the second ring-shaped member, thereby further enhancing product precision.

DETAILED DESCRIPTION OF THE PREFERRED EMBODIMENTS

Embodiments of the present invention will be explained with reference to the drawings.

[First Embodiment]

Figure 1:
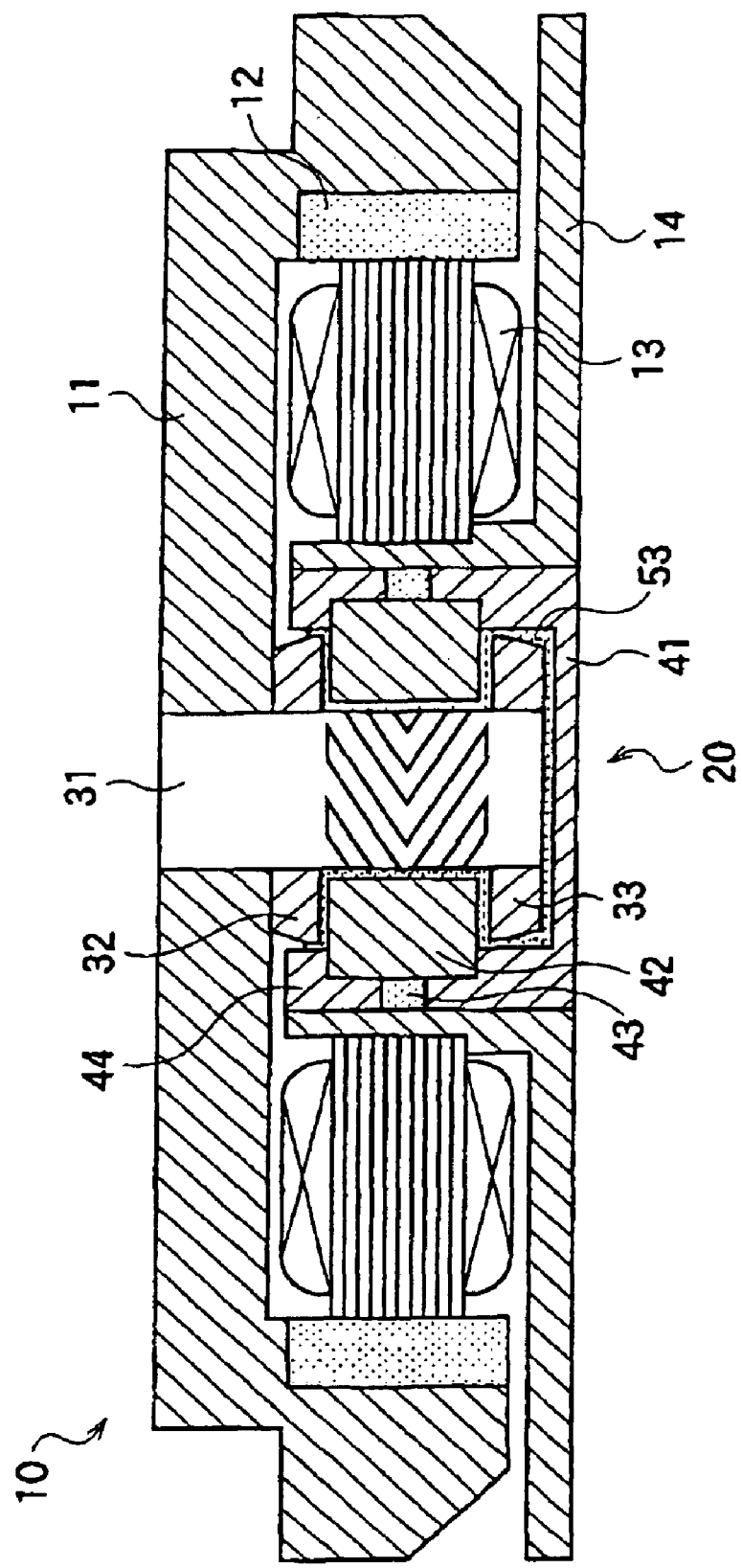
FIG. 1 is a cross sectional view showing an example when a dynamic pressure bearing device in a first embodiment of the present invention is incorporated in an HDD rotation driver.
Figure 2:
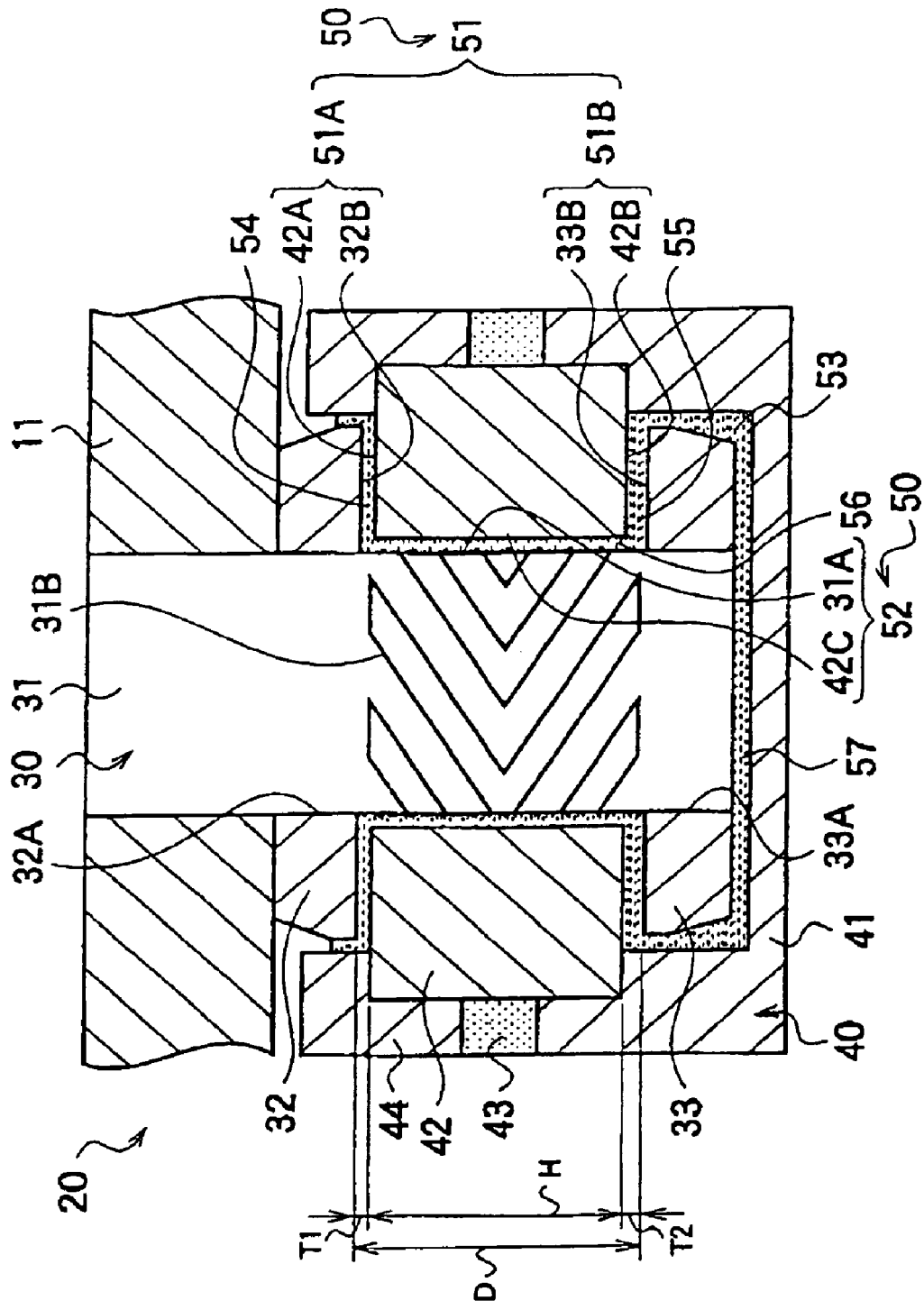
FIG. 2 is an enlarged cross sectional view of the dynamic pressure bearing device in the first embodiment.
Figure 3:
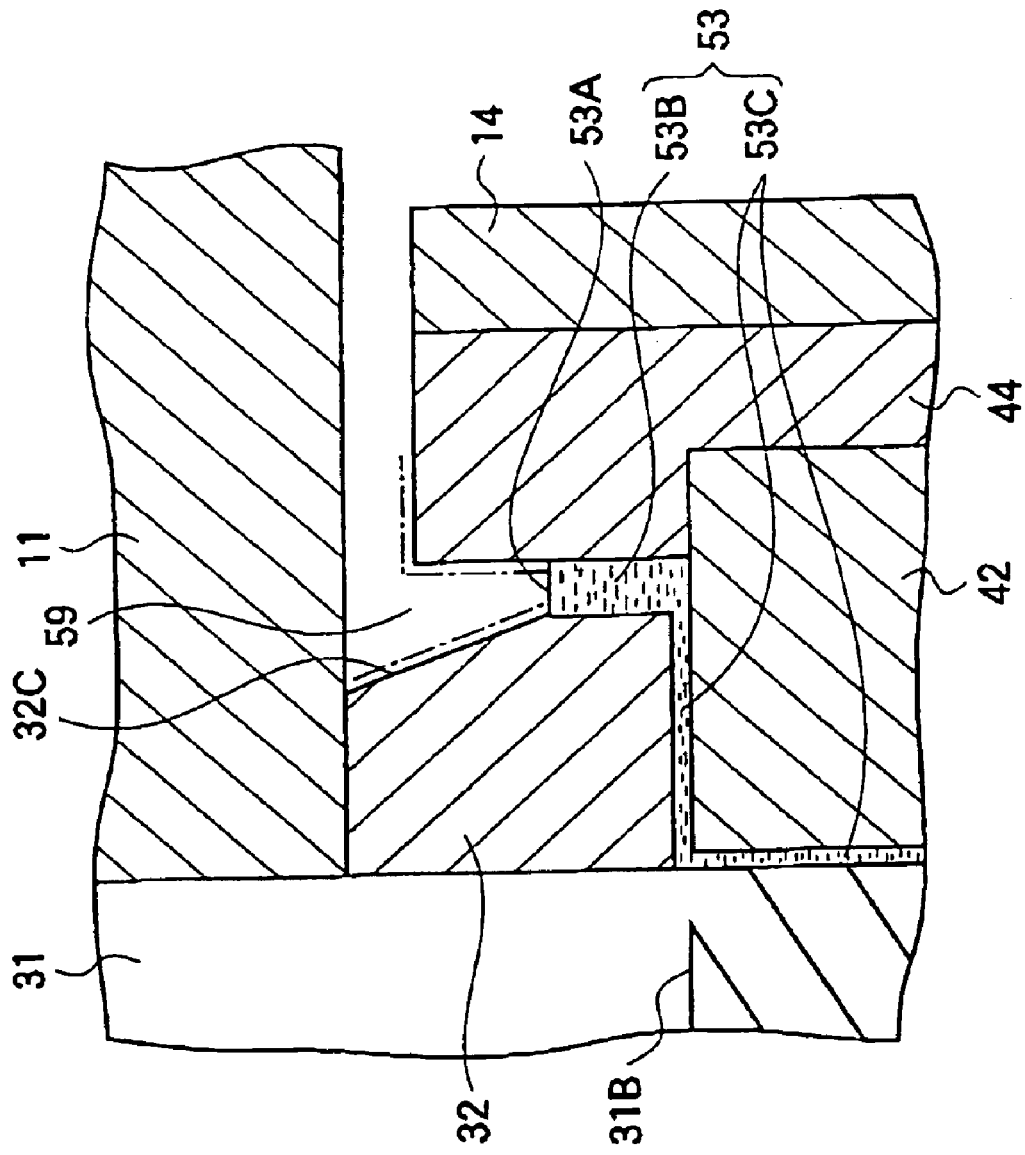
FIG. 3 is an enlarged cross sectional view of an essential part of the dynamic pressure bearing device in the first embodiment.

FIG. 1 is a cross sectional view showing an example when a dynamic pressure bearing device 20 of a first embodiment of the present invention is incorporated in an HDD rotation driver 10, and FIG. 2 shows an enlarged cross sectional view of the dynamic pressure bearing device 20. FIG. 3 shows an enlarged cross sectional view of an essential part of the dynamic pressure bearing device 20.

In FIG. 1, the dynamic pressure bearing device 20 is disposed at a center part of the HDD rotation driver 10. A hub 11 on which a not-shown memory disk is mounted is fixedly fitted to an upper part of a rotating shaft member 31 which is disposed at the rotation center of this dynamic pressure bearing device 20 so that the hub 11 rotates along with the rotating shaft member 31. A magnet member 12 for driving a motor is fixedly fitted to an inner peripheral surface of the hub 11, and a motor stator portion 13 fixed to a stator supporting member 14 is provided inside this magnet member 12 for driving a motor. The magnet member 12 for driving a motor is driven to rotate by an alternate magnetic field which is generated due to an alternate current given to the motor stator portion 13, thereby rotating the memory disk along with the hub 11.

As for the size of the HDD rotation driver 10, for example, an outer dimension (diameter) of the hub 11 is about 20 mm, the total thickness (height dimension) of the dynamic pressure bearing device 20 is about 1.5 mm to about 5.8 mm, though it varies depending on the structure of the motor stator portion 13 or the like, and the shaft dimension (diameter) of the rotating shaft member 31 is about 2 mm.

In FIG. 2, the dynamic pressure bearing device 20 includes a rotating portion 30 and a fixed portion 40. A dynamic pressure bearing portion 50 is formed between the rotating portion 30 and the fixed portion 40, and the rotating portion 30 is supported rotatably by the fixed portion 40 via this dynamic pressure bearing portion 50.

The rotating portion 30 includes the columnar rotating shaft member 31 and a first and a second ring-shaped member 32, 33 which are in a circular ring shape and fixedly fitted to an outer peripheral surface of this rotating shaft member 31. In these first ring-shaped member 32 and second ring-shaped member 33, an adhesive is applied only on inner peripheral surfaces 32A, 33A thereof which are surfaces fitted to an outer peripheral surface 31A of the rotating shaft member 31 and is not applied on respective upper and lower end surfaces.

The fixed portion 40 includes a lower supporting member 41 in a is saucer shape which is disposed on a lower end side of the rotating shaft member 31, a circular ring-shaped intermediate member 42 fixedly fined to an upper portion of this lower supporting member 41 and disposed between the first ring-shaped member 32 and the second ring-shaped member 33, a circular ring-shaped magnet member 43 disposed on an outer periphery side of this intermediate member 42, and a substantially flange-shaped upper yoke 44 disposed on an upper side of this magnet member 43 and fixedly fitted to an outer peripheral surface of the intermediate member 42. Incidentally, since no load is given to a base plate of the lower supporting member 41 and it only needs to be able to seal a liquid, this base plate only needs to have a thickness of, for example, about 0.05 mm and little space is taken in a height direction thereof.

The dynamic pressure bearing portion 50 is composed of a thrust bearing portion 51 receiving a load in a thrust direction which acts on the rotating portion 30 and a journal bearing portion 52 receiving a load in a radial direction which acts on the rotating portion 30. The thrust bearing portion 51 is formed of two layers of an upper thrust bearing portion 51A and a lower thrust bearing portion 51B.

The upper thrust bearing portion 51A is composed of a lower end surface 32B of the first ring-shaped member 32, an upper end surface 42A, which faces this lower end surface 32B, of the intermediate member 42, and an operating oil 53 for dynamic pressure generation filled in a first gap 54 which is formed between the lower end surface 32B and the upper end surface 42A which face each other.

The lower thrust bearing portion 51B is composed of an upper end surface 33B of the second ring-shaped member 33, a lower end surface 42B, which faces this upper end surface 33B, of the intermediate member 42, and an operating oil 53 for dynamic pressure generation filled in a second gap 55 which is formed between the upper end surface 33B and the lower end surface 42B which face each other.

The journal bearing portion 52 is composed of an outer peripheral surface 31A of the rotating shaft member 31, an inner peripheral surface 42C, which faces this outer peripheral surface 31A, of the intermediate member 42, and an operating oil 53 for dynamic pressure generation filled in a third gap 56 which is formed between the outer peripheral surface 31A and the inner peripheral surface 42C which face each other.

In either one of the lower end surface 32B and the upper end surface 42A constituting the upper thrust bearing portion 51A and either one of the upper end surface 33B and the lower end surface 42B constituting the lower thrust bearing portion 51B, not-shown indented patterns for dynamic pressure generation are formed respectively. These indented patterns may have any shape and depth, and may be an ordinary one suitable for dynamic pressure generation. The outer peripheral surface 31A of the rotating shaft member 31 constituting the journal bearing portion 52 also has an indented pattern 31B for dynamic pressure generation formed in a belt shaped region along the full periphery of this outer peripheral surface 31A. It should be noted that the indented pattern 31B, which may have any shape and depth, may be an ordinary one suitable for dynamic pressure generation, and is not limited to the shape shown in the drawing.

The first gap 54, the second gap 55, the third gap 56, and a gap 57 formed between lower end surfaces of the rotating shaft member 31 and the second ring-shaped member 33 and the base plate of the lower supporting member 41 all communicate with one another.

In FIG. 3, a lipophobic agent for preventing the exudation of the operating oil 53 is applied at least on a portion, which is shown by a dashed line in the drawing, of the surfaces of the first ring-shaped member 32 and the upper yoke 44 which are constituent members disposed in the vicinity of a boundary surface 53A between the operating oil 53 and an external space 59. Incidentally, the lipophobic agent may be applied on a portion other than the portion shown by the dashed line in the drawing. For example, when the lipophobic agent is used instead of a cutting agent in machining the first ring-shaped member 32 and the upper yoke 44 as will be described later, the first ring-shaped member 32 and the upper yoke 44 are completely covered with the lipophobic agent, but it does not become a significant problem since the thickness thereof is very small. The portion, which is shown by the dashed line in the drawing, of the surface of the first ring-shaped member 32 is a tapered surface 32C.

Out of magnetic fluids which are used as the operating oils 53, a first magnetic fluid 53B is disposed in the vicinity portion of the boundary surface 53A, and in the portion other than the vicinity portion of the boundary surface 53A, namely, the gaps 54 to 57 (refer to FIG. 2), a second magnetic fluid 53C having a lower concentration than that of the first magnetic fluid 53B is disposed. Here, as the first magnetic fluid 53B, for example, a magnetic fluid of about 100 gausses to about 200 gausses which is sufficient for the magnetic fluid to be held by a ferromagnetic field can be suitably used, and as the second magnetic fluid 53C, for example, a low-concentration magnetic fluid whose saturation magnetization is about 10 gausses to about 30 gausses (the metal particulate content thereof is about one fourth compared with a magnetic fluid whose saturation magnetization is 200 gausses) which is as close to an ordinary lubricating oil as possible can be suitably used.

In FIG. 2 and FIG. 3, a magnet member 43 is magnetized in an axial direction of the rotating shaft member 31 (vertical direction in the drawing), thereby forming a magnetic closed circuit along a passage extending along the magnet member 43, the upper yoke 44, the first ring-shaped member 32, the rotating shaft member 31, the second ring-shaped member 33, the lower supporting member 41, and the magnet member 43. This causes a ferromagnetic field to be formed in the vicinity portion of the boundary surface 53A, namely, between the outer peripheral surface of the first ring-shaped member 32 and the inner peripheral surface, which faces this outer peripheral surface, of the upper yoke 44 so that the first magnetic fluid 53B is held by the ferromagnetic field. As the magnet member 43, a magnet member formed by, for example, blending samarium, iron, and nitrogen (Sm—Fe—N magnet) can be suitably used. This is a bond magnet whose particle diameter is, for example, about 5 μm.

In the first embodiment as described above, the dynamic pressure bearing device 20 is assembled for manufacture in the following manner.

[First Manufacturing Method]

Figure 4:
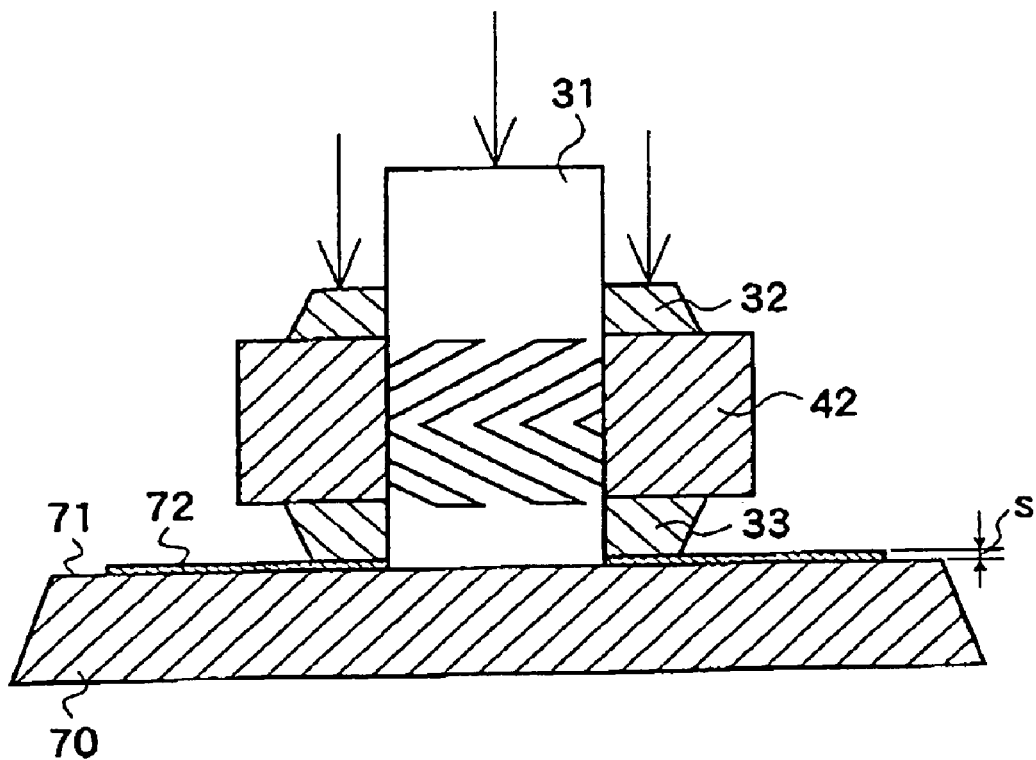
FIG. 4 is an explanatory view of a first manufacturing method of the dynamic pressure bearing device in the first embodiment.

First, as shown in FIG. 4, a work table 70 for assembly work is prepared. An upper surface of this work table 70 is a flat surface 71. A metal leaf 72 as an assembly jig having a thickness S corresponding to a total value (T1+T2) of a width dimension T1 (refer to FIG. 2) of the first gap 54 and a width dimension T2 (refer to FIG. 2) of the second gap 55 is also prepared. The thickness S of the metal leaf 72 is, for example, about 4 μm to about 8 μm.

Next, as shown in FIG. 4, the rotating shaft member 31 is mounted on the flat surface 71 with a lower end surface of the rotating shaft member 31 being in contact with the flat surface 71, and the metal leaf 72, the second ring-shaped member 33, the intermediate member 42, and the first ring-shaped member 32 are disposed in tiers in this order around the rotating shaft member 31. Then, the rotating shaft member 31 and the first ring-shaped member 32 are pressed in a direction of arrows in the drawing, and in this state, the first ring-shaped member 32 is fixed to the rotating shaft member 31 with an adhesive which is applied on a surface thereof to be fitted to the rotating shaft member 31.

Figure 5:
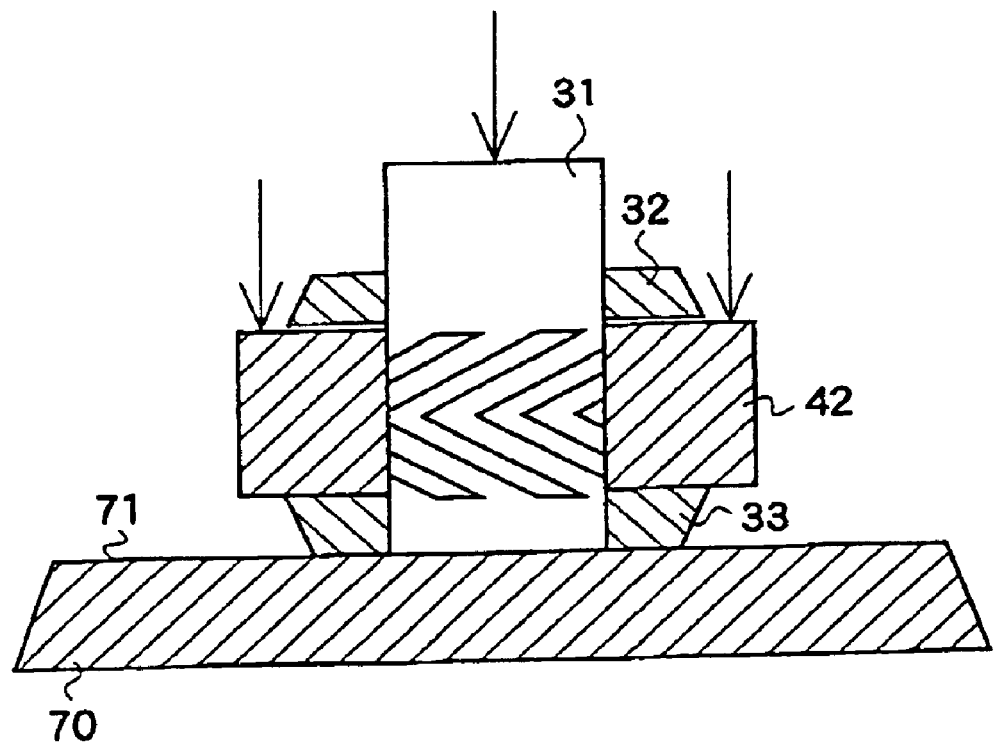
FIG. 5 is another explanatory view of the first manufacturing method of the dynamic pressure bearing device in the first embodiment.

Subsequently, as shown in FIG. 5, after the rotating shaft member 31 is separated from the flat surface 71 to remove the metal leaf 72, the rotating shaft member 31 is again mounted on the flat surface 71 with the lower end surface of the rotating shaft member 31 being in contact with the flat surface 71, and the second ring-shaped member 33 and the intermediate member 42 are moved in an axial direction of the rotating shaft member 31 to bring the second ring-shaped member 33 into contact with the flat surface 71. Then, the rotating shaft member 31 and the intermediate member 42 are pressed in the direction of arrows in the drawing, and in this state, the second ring-shaped member 33 is fixed to the rotating shaft member 31 with an adhesive which is applied on a surface thereof to be fitted to the rotating shaft member 31. Through these processes, a distance D (refer to FIG. 2) between the lower end surface 32B of the first ring-shaped member 32 and the upper end surface 33, which faces the lower end surface 32B, of the second ring-shaped member 33 is made equal to a total value (H+S) of a thickness dimension H (refer to FIG. 2) of the intermediate member 42 and a thickness dimension S (refer to FIG. 4) of the metal leaf 72 as an assembly jig.

Thereafter, after the lower supporting member 41, the magnet member 43, and the upper yoke 44 are fitted to the intermediate member 42, the second magnetic fluid 53C is injected from the vicinity of the tapered surface 32C (refer to FIG. 3) and filled in the gaps 54 to 57. Then, the first magnetic fluid 53B is further injected from the vicinity of the tapered surface 32C. As an injecting operation of the first and second magnetic fluids 53B, 53C, means such as a vacuum injection method (refer to Japanese Patent Application No. Hei 11-350470) can be suitably used, and by this method, the first and second magnetic fluids 53B, 53C can be filled with no bubbles being mixed therein.

In manufacturing the first ring-shaped member 32 and the upper yoke 44, the following methods are adoptable. Namely, as a first method, such a method is available that a lipophobic agent is used instead of a cutting agent for machining in machining the first ring-shaped member 32 and the upper yoke 44.

As a second method, such a method is available that, after the first ring-shaped member 32 and the upper yoke 44 are first machined using an ordinary cutting agent for machining, they undergo dry machining without using a cutting agent to remove the cutting agent remaining on the surfaces of the first ring-shaped member 32 and the upper yoke 44, and thereafter, the lipophobic agent is applied on these surfaces. As the dry machining, for example, working with an abrasive paper (sandpaper) or a grind stone, working with a turning tool instead of the cutting agent, or the like is available.

As a third method, such a method is available that, after the first ring-shaped member 32 and the upper yoke 44 are first machined using the ordinary cutting agent for machining, the cutting agent remaining on the surfaces of these first ring-shaped member 32 and the upper yoke 44 are removed while the lipophobic agent is applied on these surfaces, by using a surface treating material which is capable of polishing or cutting and capable of retaining the lipophobic agent abundantly. As the surface treating material capable of polishing and cutting and capable of retaining the lipophobic agent abundantly, for example, a sponge abrasive, a pad abrasive, a nonwoven fabric surface treating material, and so on can be suitably used.

As a fourth method, such a method is available that, after the first ring-shaped member 32 and the upper yoke 44 are first machined using an ordinary cutting agent for machining, an ozone gas is blown thereto to remove the cutting agent remaining on the surfaces of the first ring-shaped member 32 and the upper yoke 44, and thereafter, the lipophobic agent is applied on these surfaces.

[Second Manufacturing Method]

In the second manufacturing method, an assembly jig 60 shown below is used to assemble the dynamic pressure bearing device 20. The assembly jig 60 will be explained first. Next, the assembling method of the dynamic pressure bearing device 20 will be explained.

Figure 6:
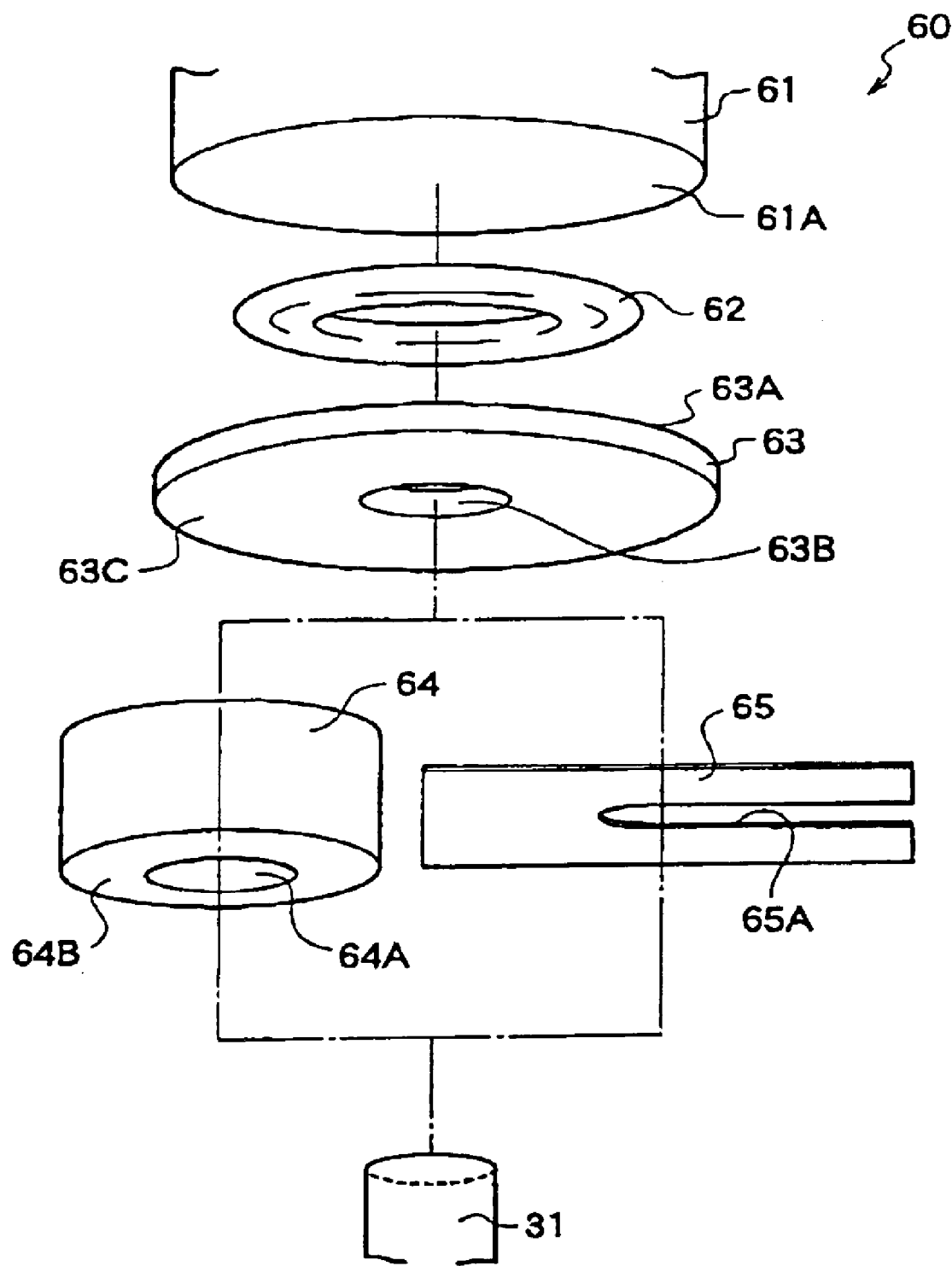
FIG. 6 is an exploded perspective view of an assembly jig of the dynamic pressure bearing device in the first embodiment.

In FIG. 6, the assembly jig 60 used in assembling the dynamic pressure bearing device 20 includes, from the upper side in the drawing, a pressure source side member 61, for example, in a column shape, an O-ring 62 as a closed ring-shaped resilient member, an O-ring receiving member 63 as an abutting portion side member, for example, in a column shape or a disk shape, a right angle setting member 64 as an abutting portion side member, for example, in a column shape, and a metal leaf 65. Incidentally, though not shown, jigs having various sizes and shapes used for alignment and so on are additionally prepared. For example, a commercially available metal washer and so on can be suitably used as these various jigs.

The pressure source side member 61 is connected to a pressure source, for example, a vise, a cylinder device, or the like, and it is intended for transmitting a pressure generated by the pressure source to the O-ring receiving member 63 via the O-ring 62.

As the O-ring 62, one using, for example, a nitrile rubber as a material thereof and so on can be suitably used. The O-ring 62 is sandwiched between a flat surface which is formed on a lower surface 61A of the pressure source side member 61 and a flat surface which is formed on an upper surface 63A of the O-ring receiving member 63, and is intended for transmitting the pressure from the pressure source side member 61 to the O-ring receiving member 63. As for the size of the O-ring 62, one having an inner dimension (diameter) of, for example, about 3.5 mm or about 4.5 mm, a thickness (diameter of a vertical cross section) of, for example, about 1.5 mm, or the like can be suitably used.

The O-ring receiving member 63 has a through hole passing therethrough from an upper surface to a lower surface thereof, and this through hole forms a rotating shaft member inserting portion 63B into which the rotating shaft member 31 is to be to be inserted. A lower surface 63C of the O-ring receiving member 63 is an abutting portion which abuts on a pressed member.

The right angle setting member 64 is used for setting the second ring-shaped member 33 perpendicular to the rotating shaft member 31 when the second ring-shaped member 33 is adhesively fixed to the rotating shaft member 31. The right angle setting member 64 has a through hole passing therethrough from an upper surface to a lower surface thereof, and this through hole forms a rotating shaft member inserting portion 64A into which the rotating shaft member 31 is to be to be inserted. A lower surface 64B of the right angle setting member 64 is an abutting portion which abuts on the pressed member.

The metal leaf 65 has a thickness S (refer to FIG. 8) corresponding to a total value (T1+T2) of a width dimension T1 (refer to FIG. 2) of the first gap 54 and a width dimension 12 (refer to FIG. 2) of the second gap 55. The thickness S of the metal leaf 65 is, for example, about 4 μm to about 8 μm. The metal leaf 65 has a notch portion 65A formed by substantially U-shape cutting so that the rotating shaft member 31 in a standing position can be inserted into or removed from this notch portion 65A in a horizontal direction (a direction along the front and rear surfaces of the metal leaf 65).

Figure 7:
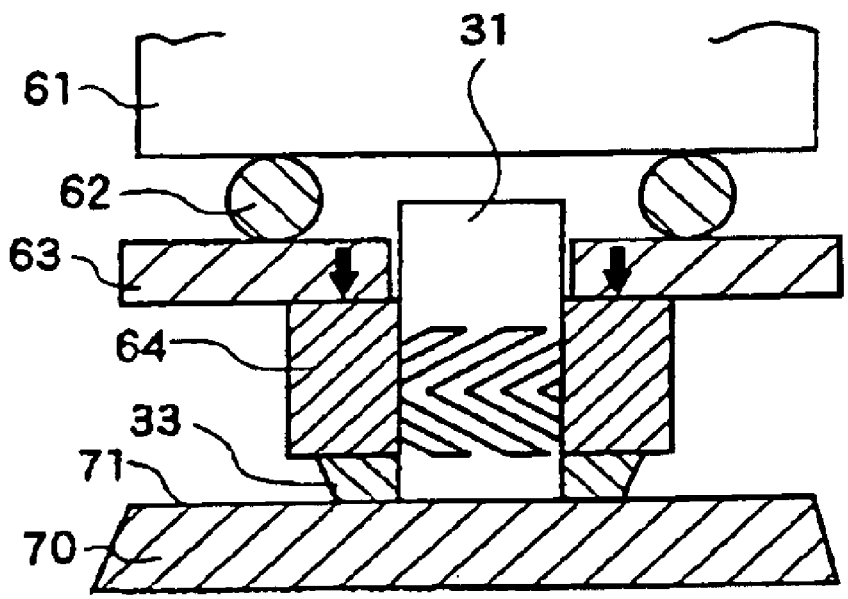
FIG. 7 is an explanatory view of a second manufacturing method of the dynamic pressure bearing device in the first embodiment.

Next, the assembly method of the dynamic pressure bearing device 20 will be explained as is stated above. First, as shown in FIG. 7, the work table 70 is prepared.

Next, the rotating shaft member 31 is mounted on the flat surface 71 with the lower end surface of the rotating shaft member 31 being in contact with the flat surface 71, and the second ring-shaped member 33 is disposed around the rotating shaft member 31 so as to be in contact with the flat surface 71. Further, the right angle setting member 64, the O-ring receiving member 63, the O-ring 62, and the pressure source side member 61 are arranged in tiers in this order above the second ring-shaped member 33, and a pressure is applied from the pressure source in this state. Then, the pressure generated by the pressure source is transmitted to the O-ring receiving member 63 via the O-ring 62 from the pressure source side member 61, and further applied to the second ring-shaped member 33 via the right angle setting member 64 as shown by arrows in FIG. 7. Then, while the downward pressure is thus applied to the second ring-shaped member 33, the second ring-shaped member 33 is fixed to the rotating shaft member 31 by using an adhesive applied on the surface thereof to be fitted to the rotating shaft member 31.

Figure 8:
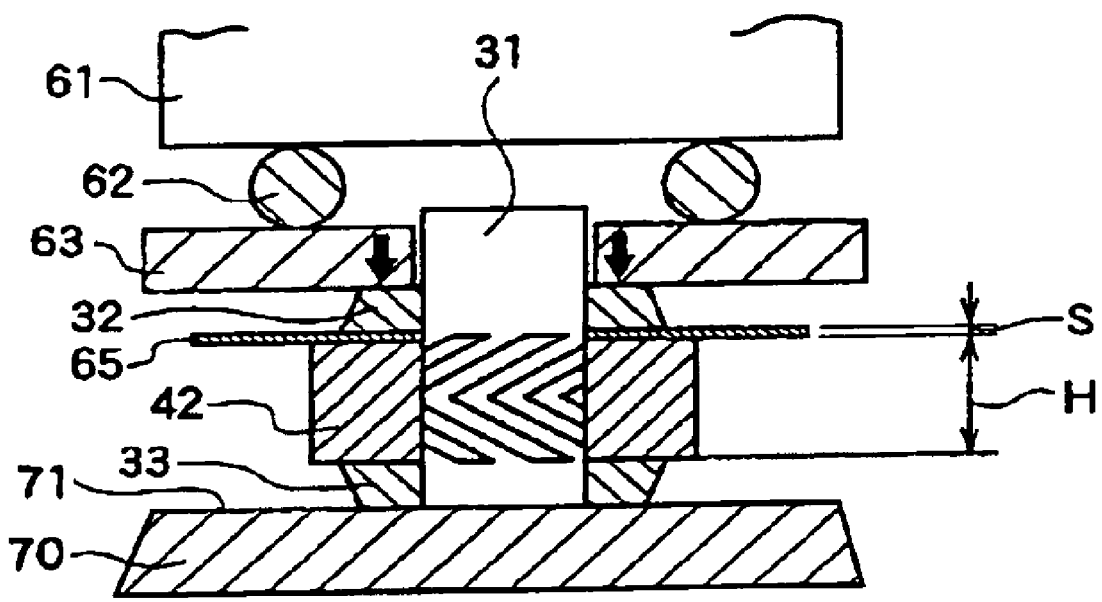
FIG. 8 is another explanatory view of the second manufacturing method of the dynamic pressure bearing device in the first embodiment.

Subsequently, after the right angle setting member 64, the O-ring receiving member 63, the O-ring 62, and the pressure source side member 61 which are disposed above the second ring-shaped member 33 are removed, the intermediate member 42, the metal leaf 65, the first ring-shaped member 32, the O-ring receiving member 63, the O-ring 62, and the pressure source side member 61 are arranged in tiers in this order above the second ring-shaped member 33 and in this state, are given a pressure from the pressure source, as shown in FIG. 8. Consequently, the pressure generated by the pressure source is transmitted to the O-ring receiving member 63 from the pressure source side member 61 via the O-ring 62, and as shown by arrows in FIG. 8, further applied to the first ring-shaped member 32. Then, while the downward pressure is thus applied to the first ring-shaped member 32, the first ring-shaped member 32 is fixed to the rotating shaft member 31 with an adhesive which is applied on a surface thereof to be fitted to the rotating shaft member 31. Through these processes, the distance D (refer to FIG. 2) between the lower end surface 32B of the first ring-shaped member 32 and the upper end surface 33B of the second ring-shaped member 33 is made equal to the total value (H+S) of the thickness dimension H of the intermediate member 42 and the thickness dimension S of the metal leaf 65 (refer to FIG. 8).

Thereafter, the metal leaf 65 is pulled out to obtain the state shown in FIG. 1 and FIG. 2, in which a gap corresponding to the thickness S of the metal leaf 65 is formed between the first ring-shaped member 32 and the second ring-shaped member 33, and this gap becomes the gaps 54, 55 (T1+T2: refer to FIG. 2) of the thrust bearing portion 51 so that the major part of the dynamic pressure bearing device 20 is completed.

[Third Manufacturing Method]

Figure 9:
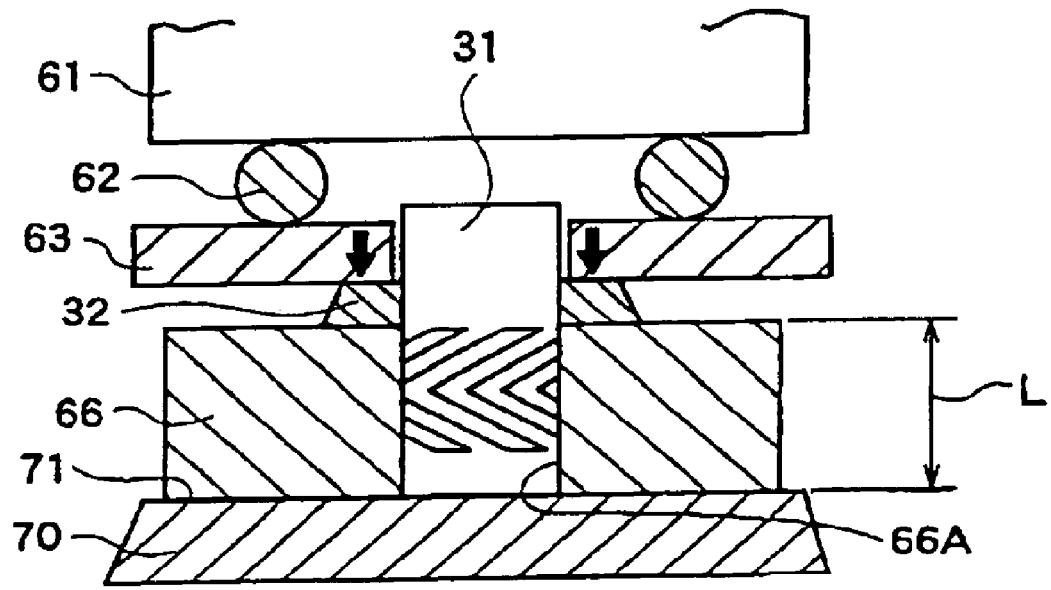
FIG. 9 is an explanatory view of a third manufacturing method of a dynamic pressure bearing device in a second embodiment of the present invention.
Figure 10:
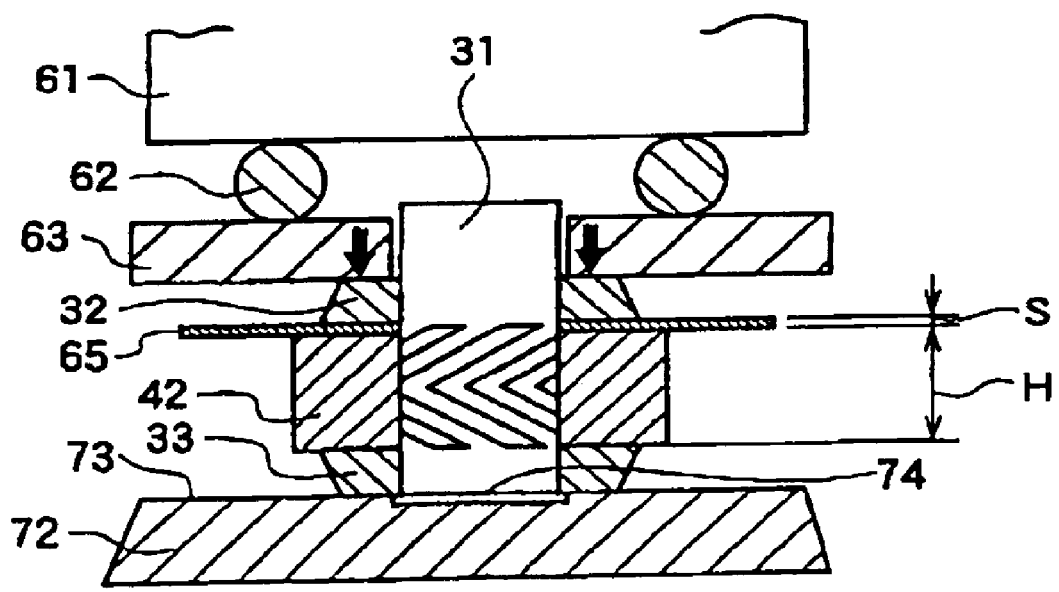
FIG. 10 is another explanatory view of a third manufacturing method of the dynamic pressure bearing device in the second embodiment.

In the third manufacturing method, the dynamic pressure bearing device 20 is assembled using the aforesaid assembly jig 60 as shown in FIG. 9 and FIG. 10.

In the second manufacturing method, the right angle setting member 64 is prepared as the assembly jig 60 used for assembling the dynamic pressure bearing device 20, but in the third manufacturing method, a right angle setting member 66 is prepared instead of the right angle setting member 64 as an assembly jig as shown in FIG. 9. The right angle setting member 66 has, for example, a column shape, and an upper surface and a lower surface thereof are both flat and formed to be parallel to each other. This right angle setting member 66 is used for setting the first ring-shaped member 32 perpendicular to the rotating shaft member 31 and for alignment in a height direction of the first ring-shaped member 32 when the first ring-shaped member 32 is adhesively fixed to the rotating shaft member 31. The right angle setting member 66 has a through hole passing therethrough from the upper surface to the lower surface thereof, and this through hole forms a rotating shaft member inserting portion 66A into which the rotating shaft member 31 is to be to be inserted. A height dimension L of the right angle setting member 66 corresponds to the total value of the thickness dimension S of the metal leaf 65, the thickness dimension H of the intermediate member 42, and a thickness dimension of the first ring-shaped member 32.

First, the rotating shaft member 31 is mounted on the flat surface 71 with the lower end surface of the rotating shaft member 31 being in contact with the flat surface 71 of the work table 70 as shown in FIG. 9, and the right angle setting member 66 is disposed around the rotating shaft member 31 to be in contact with the flat surface 71. Further, the first ring-shaped member 32, the O-ring receiving member 63, the Wring 62, and the pressure source side member 61 are arranged in tiers in this order above the right angle setting member 66, and in this state, are given a pressure by the pressure source. Consequently, the pressure generated by the pressure source is transmitted to the O-ring receiving member 63 from the pressure source side member 61 via the O-ring 62 and further applied to the first ring-shaped member 32 as shown by arrows in FIG. 9. Then, while the downward pressure is thus applied to the first ring-shaped member 32, the first ring-shaped member 32 is fixed to the rotating shaft member 31 with an adhesive which is applied on the surface thereof to be fitted to the rotating shaft member 31.

Next, as shown in FIG. 10, a work table 72 different from the work table 70 is prepared. An upper surface of this work table 72 is a flat surface 73 similarly to the work table 70, but unlike the work table 70, a concave portion 74 for having the rotating shaft member 31 retreat therein is provided. Incidentally, the height dimension L of the right angle setting member 66 may be slightly smaller than a total value of the thickness dimension S of the metal leaf 65, the thickness dimension H of the intermediate member 42, and the thickness dimension of the first ring-shaped member 32. In this case, it is not necessary to provide the concave portion 74 so that the assembly work can be carried out using only one work table 70.

Subsequently, after the rotating shaft member 31 is separated from the flat surface 71 to remove the right angle setting member 66, the metal leaf 65, the intermediate member 42, and the second ring-shaped member 33 are arranged in a space formed after the right angle setting member 66 is removed so that they are mounted on the work table 72, as shown in FIG. 10. At this time, they are so arranged that the lower end portion of the rotating shaft member 31 is located right above the concave portion 74 and the second ring-shaped member 33 is in contact with the flat surface 73. Either the metal leaf 65 or the intermediate member 42 may be arranged on an upper side, but the explanation here is given on assumption that the metal leaf 65 is arranged above the intermediate member 42 as shown in FIG. 10.

In this way, after such a state is produced on the work table 72 that the second ring-shaped member 33, the intermediate member 42, the metal leaf 65, and the first ring-shaped member 32 already fixed to the rotating shaft member 31 are arranged in tiers in this order around the rotating shaft member 31, the O-ring receiving member 63, the O-ring 62, and the pressure side member 61 are further arranged in tiers in this order above the first ring-shaped member 32 and in this state, they are given a pressure by the pressure source. Consequently, the pressure generated by the pressure source is transmitted to the O-ring receiving member 63 from the pressure source side member 61 via the O-ring 62 and further applied to the first ring-shaped member 32 as shown by arrows in FIG. 10. Then, while the downward pressure is thus applied to the first ring-shaped member 32, the second ring-shaped member 33 is fixed to the rotating shaft member 31 with an adhesive which is applied on a surface thereof to be fitted to the rotating shaft member 31. Through the above processes, the distance D (refer to FIG. 2) between the lower end surface 32B of the first ring-shaped member 32 and the upper end surface 33B, which faces the lower end surface 32B, of the second ring-shaped member 33 is made equal to the total value (H+S) of the thickness dimension H of the intermediate member 42 and the thickness dimension S of the metal leaf 65 (refer to FIG. 10).

Thereafter, the metal leaf 65 is pulled out to obtain the state shown in FIG. 1 and FIG. 2, in which a gap corresponding to the thickness S of the metal leaf 65 is formed between the first ring-shaped member 32 and the second ring-shaped member 33, and this gap becomes the first and second gaps 54, 55 (T1+T2: refer to FIG. 2) of the thrust bearing portion 51 so that the major part of the dynamic pressure bearing device 20 is completed.

According to the first embodiment as described above, the following effect is obtainable. Namely, since the first ring-shaped member 32 and the second ring-shaped member 33 are both fixed to the rotating shaft member 31 only with the adhesive which is applied on the surfaces thereof to be fitted to the rotating shaft member 31, the rotating portion 30 can be so structured that a layer of the adhesive (a layer spreading along surfaces orthogonal to the axis of the rotating shaft member 31) is not formed between the first ring-shaped member 32 and the second ring-shaped member 33. Since this makes it possible to make the arrangement gap between the first ring-shaped member 32 and the second ring-shaped member 33 irrelevant to the thickness of the adhesive layer, such a situation is avoidable that the arrangement gap between the fist ring-shaped member 32 and the second ring-shaped member 33 cannot be set to a predetermined value due to the influence of the thickness variation of the adhesive layer. Therefore, the first and second gaps 54, 55 of the thrust bearing portion 51 can be set to desired values so that a miniature and high-precision dynamic pressure bearing device 20 is realizable.

Further, since the adhesive is applied on the surfaces, which are to be fitted to the rotating shaft member 31, of the first and second ring-shaped members 32, 33, a higher adhesive strength is obtainable with the use of an anaerobic adhesive than in the case when the adhesive is applied on end surfaces of the members (surfaces orthogonal to the axis of the rotating shaft member 31). This enables the realization of a dynamic pressure bearing device 20 which is resistant to externally given shocks and vibrations.

Further, since the formation of the gaps with desired width dimensions in the thrust bearing portion eliminates the necessity of high-precision working for forming a stepped part and high-precision thickness-wise working, the dynamic pressure bearing device 20 can be manufactured at low cost without being accompanied by difficult machining. As the entire dynamic pressure bearing device 20, it can be also worked easily and manufactured at low cost since each constituent member thereof has a simple structure, the rotating portion 30 does not include any member with a stepped portion for alignment in a height direction or any member with a stepped portion for fixing, and in the fixed portion 40, no high-precision step need not be formed, though the lower supporting member 41 and the upper yoke 44 are members with a stepped portion.

Moreover, since the second magnetic fluid 53C having a lower concentration than that of the first magnetic fluid 53B is provided in the portion other than the vicinity of the boundary surface 53A (refer to FIG. 3) between the operating oil 53 and the external space 59, the life of the dynamic pressure bearing device 20 can be made long compared with the case when the first magnetic fluid 53B is used as the entire operating oil 53. In other words, the disadvantages of the increase in power consumption and the decrease in the life of the bearing due to the use of the magnetic fluid are avoidable.

Further, since the first magnetic fluid 53B is disposed in the vicinity of the boundary surface 53A, the operating oil 53 can be prevented from flowing out to the external space 59. Since the gap formed in the vicinity of the boundary surface 53A is large compared with the gaps 54 to 57 in the other portion and is not influenced much by a shear due to the rotation, such a disadvantage is avoidable that the life of the dynamic pressure bearing device 20 is shortened due to the influence of the first magnetic fluid 53B which is disposed in the vicinity of the boundary surface 53A.

Moreover, since the second magnetic fluid 53C is filled instead of the ordinary lubricating oil in the gaps 54 to 57 in the portion other than the vicinity of the boundary surface 53A, the dispersion of the first magnetic fluid 53B can be prevented. This enables the first magnetic fluid 53 to exert a predetermined function so that the operating oil 53 can be prevented from flowing out to the external space 59. Incidentally, strictly speaking, the first magnetic fluid 53B and the second magnetic fluid 53C are mixed with each other in the boundary portion therebetween, but since the dispersion is limited within the range of the magnetic gradient, the range of the dispersion is a negligible range.

Further, since the first magnetic fluid 53B is disposed in the vicinity of the boundary surface 53A, static electricity on a disk generated during the disk rotation can be grounded via this first magnetic fluid 53B, which enables the prevention of the destruction of a bead due to the static electricity.

If the magnet member formed by blending samarium, iron, nitrogen (Sm—Fe—N magnet) is used as the magnet member 43, the magnet member 43 can be miniaturized, and in accordance with this miniaturization, the dynamic pressure bearing device 20 can also be miniaturized. For example, even the magnet member having the size of 6.5 mm in outer diameter, about 5 mm in inner diameter, and about 0.4 mm in thickness is sufficiently durable for use. This can constitute even a microminiature spindle motor for disk-rotating-type memory using a disk whose outer diameter is, for example, 1.5 inch or smaller.

Further, since the use of the Sm—Fe—N magnet as the magnet member 43 enables the miniaturization of the magnet member 43 and the reduction in a cross sectional area of the magnet member 43, the strength of the fixed portion 40 can be also enhanced. This is because, though the strength of the HDD rotation deriver 10 for supporting the rotating disk needs to be enhanced, the Sm—Fe—N magnet as the magnet member 43 does not serve as a member for enhancing the strength of the fixed portion 40 since it is a bond magnet, so that the areas of the bonding surfaces of the metallic members other than the magnet member 43 need to be increased, which is realized by reducing the area of the cross section of the magnet member 43.

Moreover, since the use of the Sm—Fe—N magnet as the magnet member 43 can miniaturize the magnet member 43, the adverse effect given to a hard disk can be avoided. This is because, when a magnetic circuit is constituted by the HDD, since the size of the magnet forms a leakage magnetic field to give an adverse effect to a hard disk for magnetic recording, the magnet member 43 has to be miniaturized in order to prevent this adverse effect.

Further, since, as shown in FIG. 3, the lipophobic agent for preventing the exudation of the operating oil 53 is applied at least on the portion, which is shown by the dashed line in the drawing, of the surfaces of the first ring-shaped member 32 and the upper yoke 44 which are constituent members disposed in the vicinity of the boundary surface 53A between the operating oil 53 and the external space 59, the operating oil 53 is prevented from flowing out to the external space 59.

Moreover, since the use of each of the aforesaid methods (the first to fourth methods) in applying the lipophobic agent on the surfaces of the first ring-shaped member 32 and the upper yoke 44 enables the enhancement of adhesiveness between the metal surfaces and the lipophobic agent to prevent the exfoliation of the lipophobic agent and enables the maintenance of the effect of the lipophobic agent, the flowing out of the operating oil 53 to the external space 59 due to the exudation thereof is surely prevented.

In the first manufacturing method, as shown in FIG. 4 and FIG. 5, since the distance D (refer to FIG. 2) between the lower end surface 32B of the first ring-shaped member 32 and the upper end surface 33B of the second ring-shaped member 33 which face each other is defined by using the metal leaf 72 as the assembly jig, the first and second gaps 54, 55 having desired width dimensions T1, T2 (refer to FIG. 2) can be easily formed in the thrust bearing portion 51 by utilizing the thickness S of the metal leaf 72.

In the second and third manufacturing methods, since the distance D (refer to FIG. 2) between the lower end surface 32B of the first ring-shaped member 32 and the upper end surface 33B of the second ring-shaped member 33 which face each other is defined by using the metal leaf 65, the first and second gaps 54, 55 having the desired width dimensions T1, T2 can be easily formed in the thrust bearing portion 51 by utilizing the thickness S of the metal leaf 65. The thickness S of the metal leaf 65 is generally so controlled that the variation thereof is ±0.1 μm or less, which is a sufficient precision for forming the gaps with desired width dimensions, and therefore, the miniature and high-precision dynamic pressure bearing device 20 can be manufactured at low cost.

Further, since, after the second ring-shaped member 33 is fixed to the rotating shaft member 31, the first ring-shaped member 32 is fixed to the rotating shaft member 31 while the first ring-shaped member 32 is pressed toward the second ring-shaped member 33 with the first ring-shaped member 32 and the second ring-shaped member 33 sandwiching the intermediate member 42 and the metal leaf 65 (refer to FIG. 8 and FIG. 10), the gap corresponding to the thickness S of the metal leaf 65 can be directly formed by pulling out the metal leaf 65 thereafter. Therefore, product precision can be further enhanced compared with the aforesaid manufacturing method proposed in Japanese Patent Application No. 2001-148153 by this applicant.

Since the assembly jig 60 used in the second and third manufacturing methods includes the O-ring 62, the pressure can be applied evenly to the pressed surfaces of the first and second ring-shaped members 32, 33 as the pressed members, in other words, the pressure can be applied evenly to each direction with respect to the rotating shaft member 31. This is because the O-ring 62 has a wide resilient range owing to a circular vertical cross section thereof so that the pressure applied to the O-ring receiving member 63 at each position becomes substantially the same even when the degree of the compression of the O-ring 62 at each position is different. Consequently, even when the pressure is applied while the facing surfaces of the pressure source side member 61 and the O-ring receiving member 63 are not parallel to each other or while the upper and lower surfaces of the pressure source side member 61 itself or the O-ring receiving member 63 itself are not parallel to each other, the pressure from the pressure source side member 61 can be transmitted evenly to the O-ring receiving member 63.

For example, in FIG. 8, when the lower surface of the pressure source side member 61 slants to the right, a right side cross section is greatly compressed compared with a left side cross section in the O-ring 62, but the pressure transmitted to the O-ring receiving member 63 is scarcely different between the right side and the left side. Accordingly, since the pressure can be applied evenly to the pressed surfaces of the first and second ring-shaped members 32, 33 as the pressed members, assembly precision of the dynamic pressure bearing device 20 can be enhanced so that a high-precision product can be manufactured.

Moreover, since the O-ring 62, which is made of rubber, is not slippery, the assembly work can be facilitated.

Further, since the O-ring 62, which is intended for use, for example, as a vacuum seal and the like; has a characteristic of pressing a surface evenly, the use of the O-ring 62 makes it possible to easily secure a function of pressing a surface evenly.

Since a commercially available one is usable as the O-ring 62, it can be available at a low price to enable the reduction in equipment cost. In addition, since the O-rings 62 of a variety of materials are commercially available, selection of the material according to the intended use thereof is possible.

Since the O-ring 62 is intended for use, for example, as the vacuum seal and the like, the surface thereof is dense. Hence, since dust and so on do not easily adhere thereto, dirt generation can be prevented and in addition, it can be easily washed.

[Second Embodiment]

Figure 11:
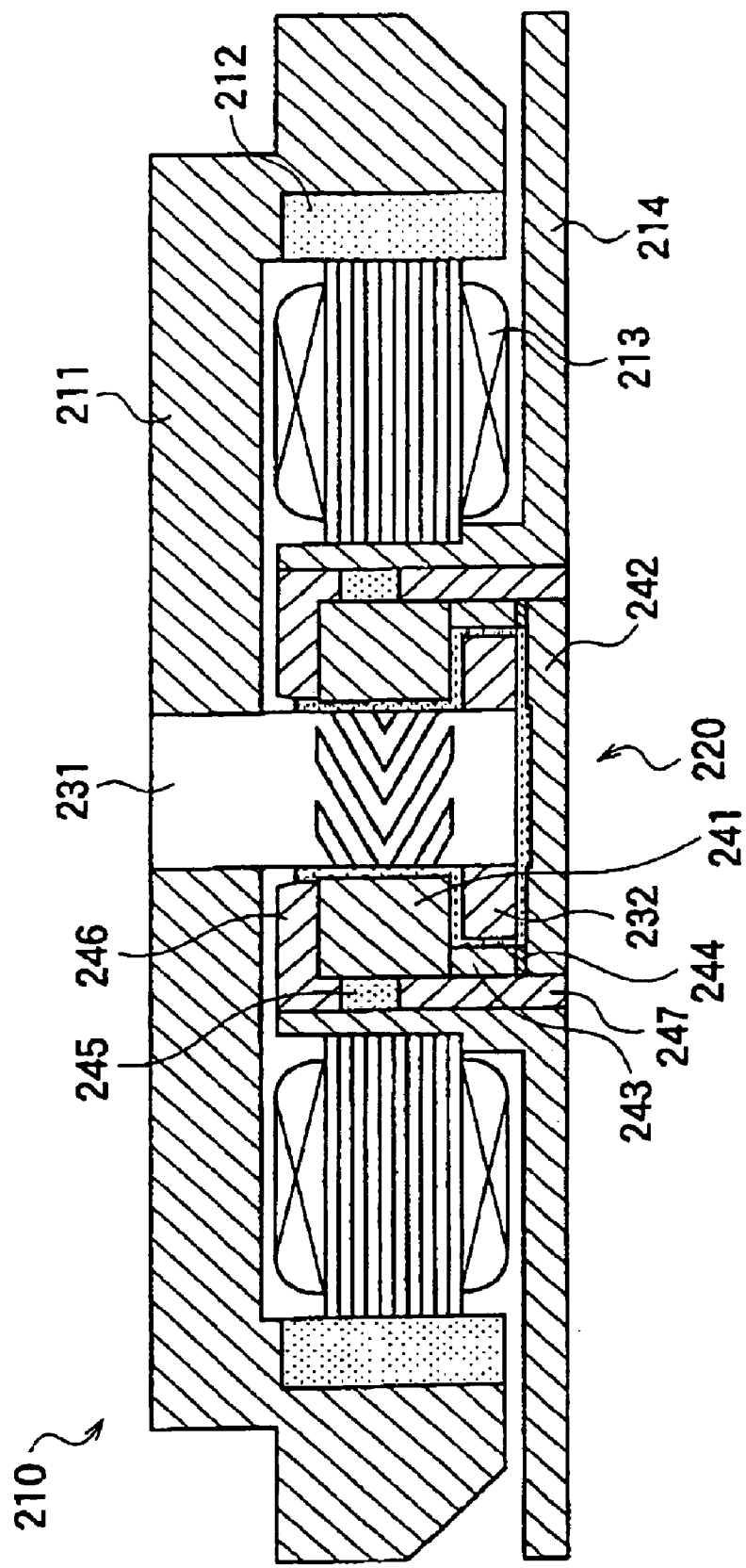
FIG. 11 is a cross sectional view showing an example when the dynamic pressure bearing device in the second embodiment of the present invention is incorporated in an HDD rotation driver.
Figure 12:
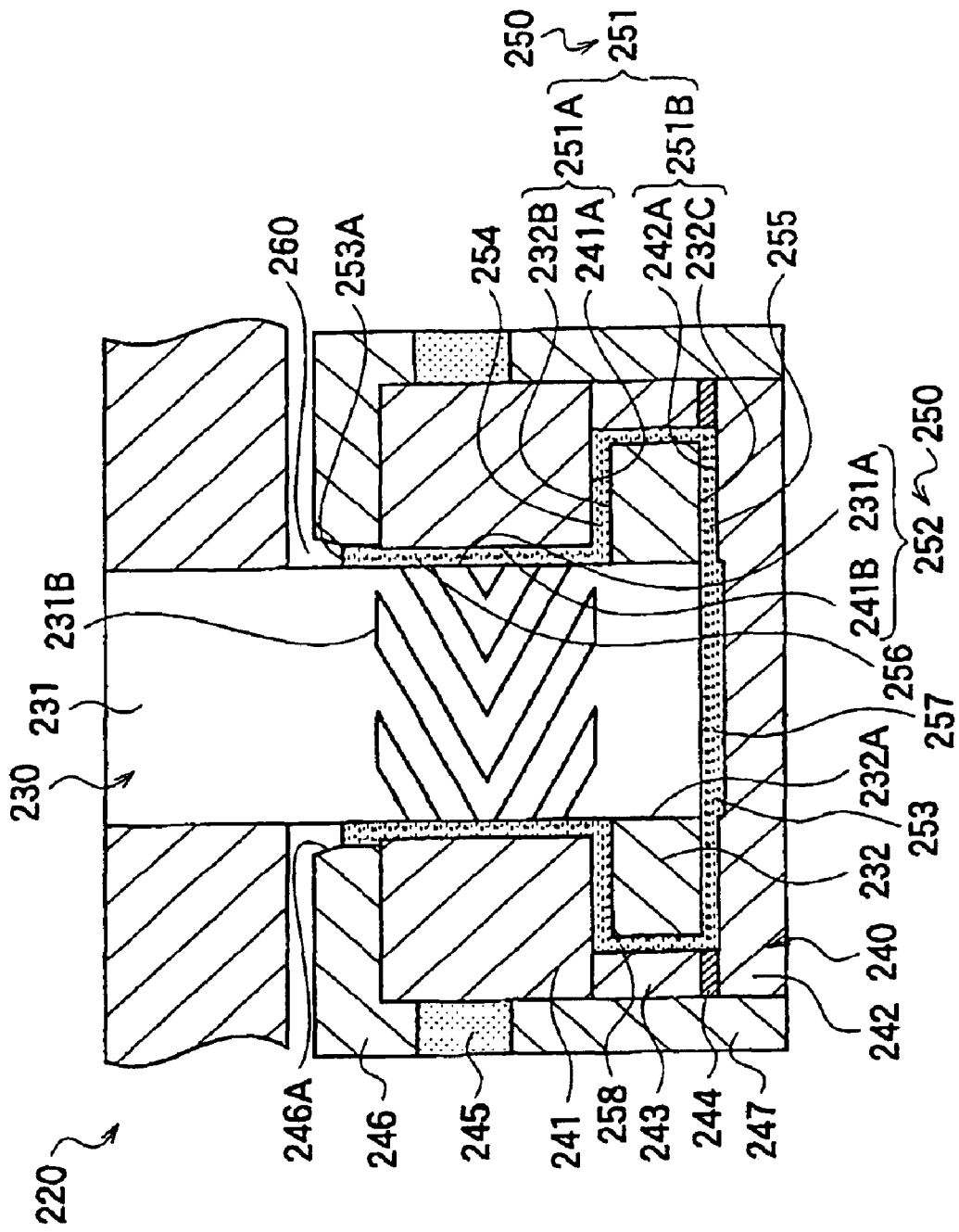
FIG. 12 is an enlarged cross sectional view of the dynamic pressure bearing device in the second embodiment.

FIG. 11 is a cross sectional view showing an example when a dynamic pressure bearing device 220 of a second embodiment of the present invention is incorporated into an HDD rotation driver 210, and FIG. 12 shows an enlarged cross sectional view of the dynamic pressure bearing device 220.

In FIG. 11, the dynamic pressure bearing device 220 is disposed at a center part of the HDD rotation driver 210. A hub 211 on which a not-shown memory disk is mounted is fixedly fitted to an upper part of a rotating shaft member 231 which is disposed at the rotation center of this dynamic pressure bearing device 220 so that the hub 211 rotates along with the rotating shaft member 231. A magnet member 212 for driving a motor is fixedly fitted to an inner peripheral surface of the hub 211, and a motor stator portion 213 fixed to a stator supporting member 214 is provided inside this magnet member 212 for driving a motor. The magnet member 212 for driving a motor is driven to rotate by an alternate magnetic field which is generated due to an alternate current given to the motor stator portion 213, thereby rotating the memory disk along with the hub 211.

The sizes of the HDD rotation driver 210 and the dynamic pressure bearing device 220 in this second embodiment are substantially the same as those of the HDD rotation driver 10 and the dynamic pressure bearing device 20 in the above-described first embodiment.

In FIG. 12, the dynamic pressure bearing device 220 includes a rotating portion 230 and a fixed portion 240. A dynamic pressure bearing portion 250 is formed between the rotating portion 230 and the fixed portion 240, and the rotating portion 230 is supported rotatably by the fixed portion 240 via this dynamic pressure bearing portion 250.

The rotating portion 230 includes a columnar rotating shaft member 231 and a ring-shaped member 232 in a circular ring shape fixedly fitted to an outer peripheral surface of this rotating shaft member 231. An inner peripheral surface 232A of the ring-shaped member 232 and an outer so peripheral surface 231A of the rotating shaft member 231 are fixed to each other with an adhesive.

The fixed portion 240 includes a first member 241 in a circular ring shape disposed on an upper side of the ring-shaped member 232, a second member 242 in a substantially disk shape disposed on a lower side of the ring-shaped member 232, and a spacer 243 in a circular ring shape and a metal leaf 244 in a circular ring shape which are disposed on the outer periphery side of the ring-shaped member 232, being sandwiched between these first member 241 and the second member 242. The spacer 243, which is worked in a thickness direction (in an axial direction of the rotating shaft member 231) in the same lot as the ring-shaped member 232, has an equal thickness to that of the ring-shaped member 232. Unlike the metal leaf 72 in FIG. 4 of the above-described first embodiment, the metal leaf 244 in this second embodiment is not a metal leaf as an assembly jig but is a metal leaf as a constituent member of the dynamic pressure bearing device 220. As the metal leaf 244, one having a thickness of, for example, about 4 μm to about 8 μm can be suitably used.

The fixed portion 240 includes a magnet member 245 in a circular ring shape disposed on an outer periphery side of the first member 241, an upper yoke 246 in a substantially flange shape disposed on an upper side of this magnet member 245, and a cylindrical lower yoke 247 disposed on a lower side of the magnet member 245.

The spacer 243 is fixedly fitted to an inner peripheral surface of the lower yoke 247. An adhesive is applied on an outer peripheral surface of the spacer 243 but is not applied on a lower end surface and an upper end surface thereof. The metal leaf 244 is only sandwiched and is not adhesively fixed.

The dynamic pressure bearing portion 250 is composed of a thrust bearing portion 251 receiving a load in a thrust direction which acts on the rotating portion 230 and a journal bearing portion 252 receiving a load in a radial direction which acts on the rotating portion 230. The thrust bearing portion 251 is formed of two layers of an upper thrust bearing portion 251A and a lower thrust bearing portion 251B.

The upper thrust bearing portion 251A is composed of a lower end surface 241A of the first member 241, an upper end surface 233B, which faces this lower end surface 241A, of the ring-shaped member 232, and an operating oil 253 for dynamic pressure generation filled in a first gap 254 which is formed between the lower end surface 241A and the upper end surface 232B which face each other.

The lower thrust bearing portion 251B is composed of an upper end surface 242A of the second member 242, a lower end surface 232C, which faces this upper end surface 242A, of the ring-shaped member 232, and an operating oil 253 for dynamic pressure generation filled in a second gap 255 which is formed between the upper end surface 242A and the lower end surface 232C which face each other.

The journal bearing portion 252 is composed of an outer peripheral surface 231A of the rotating shaft member 231, an inner peripheral surface 241B, which faces this outer peripheral surface 231A, of the first member 241, and an operating oil 253 for dynamic pressure generation filled in a third gap 256 which is formed between the outer peripheral surface 231A and the inner peripheral surface 241B which face each other.

In either one of the lower end surface 241A and the upper end surface 232B constituting the upper thrust bearing portion 251A and either one of the upper end surface 242A and the lower end surface 232C constituting the lower thrust bearing portion 251B, not-shown indented patterns for dynamic pressure generation are formed respectively. These indented patterns may have any shape and depth and may be an ordinary one suitable for dynamic pressure generation. The outer peripheral surface 231A of the rotating shaft member 231 constituting the journal bearing portion 252 also has an indented pattern 231B for dynamic pressure generation formed in a belt shaped region along the full periphery of this outer peripheral surface 231A. It should be noted that the indented pattern 231B, which may have any shape and depth, may be an ordinary one suitable for dynamic pressure generation, and is not limited to the shape shown in the drawing.

The first gap 254, the second gap 255, the third gap 256, a gap 257 formed between a lower end surface of the rotating shaft member 231 and an upper end surface of the second member 242, and a gap 258 formed between an outer peripheral surface of the ring-shaped member 232 and an inner peripheral surface of the spacer 243 all communicate with one another.

A lipophobic agent for preventing the exudation of the operating oil 253 is applied on the surfaces of the rotating shaft member 231 and the upper yoke 246 which are constituent members disposed in the vicinity of a boundary surface 253A between the operating oil 253 and an external space 260, similarly to the first embodiment described above. Further, a tapered surface 246A is formed on the surface of the upper yoke 246.

It is also similar to the first embodiment described above that as the operating oil 253, a first magnetic fluid is used in the vicinity of the boundary surface 253A and a second magnetic fluid having a lower concentration than that of the first magnetic fluid is used in a portion other than the vicinity of the boundary surface 253A.

The material of the magnet member 245 is also the same as in the first embodiment described above, and it is also similar to the first embodiment described above that this magnet member 245 forms a magnetic closed circuit and a formed ferromagnetic field holds the first magnetic fluid.

According to the second embodiment as described above, the following effect is brought about. Namely, since no adhesive is applied on respective front and rear surfaces of the spacer 243 and the metal leaf 244 which are sandwiched between the first member 241 and the second member 242, the fixed portion 240 can be so structure that an adhesive layer (a layer spreading along surfaces orthogonal to the axis of the rotating shaft member) is not formed between the first member 241 and the second member 242. This makes it possible to set the distance between the facing surfaces of the first member 241 and the second member 242 to a total value of a thickness dimension of the spacer 243 and a thickness dimension of the metal leaf 244.

Since the ring-shaped member 232 and the spacer 243 are worked thickness-wise in an axial direction of the rotating shaft member 231 in the same lot and worked synchronously, the members having the same thickness can be easily formed. Incidentally, in working the ring-shaped member 232 and the spacer 234 thickness-wise, for example, 200 pieces of members or more are synchronously worked in general.

Consequently, the total value of the width dimensions of the two layered gaps 254, 255 constituting the thrust bearing portion 251 can be set by the thickness dimension of the metal leaf 244. The thickness of the metal leaf 244 is generally so controlled that the variation thereof is ±0.5 $\mu$m or smaller, which is a sufficient precision for forming the gaps 254, 255 having desired width dimensions. Therefore, the miniature and high-precision dynamic pressure bearing device 220 is realizable.

Moreover, since the use of the metal leaf 244 as a constituent member makes it possible to form the gaps 254, 255 having desired width dimensions to eliminate the necessity of high-precision working for forming a stepped portion and high-precision thickness-wise working, the dynamic pressure bearing device 220 can be manufactured easily and at low cost without being accompanied by difficult machining.

Each of other effects is obtainable similarly to the first embodiment described above, namely, for example, the effect in the case of using the first and second magnetic fluids as operating oils 253, the effect in the case of using the Sm—Fe—N magnet as the magnet member 245, the effect in the case of applying the lipophobic agent for preventing the exudation of the operating oil 253, and so on.

[Modification]

It should be noted that the present invention is not limited to each of the embodiments described above, and modifications and so on within such a range that the objects of the present invention can be achieved are intended to be embraced therein.

Specifically, in each of the embodiments described above, the thrust bearing portions 51, 251 are constituted of the two-layered gaps, but a thrust bearing portion may be constituted of a four-layered, a six-layered, and the like of gaps by repeatedly adopting the structure of the present invention in the axial direction as long as a problem in terms of space is not caused.

In each of the embodiments described above, the first and second magnetic fluids 53B, 53C are used as the operating oils 53, 235, but a lubricating oil may be used as the operating oil in the present invention. Incidentally, in each of the embodiments described above, the upper yokes 44, 246, which are magnetically necessary in constituting the magnetic circuit when the magnetic fluid is used as the operating oils 53, 253, are also necessary when the lubricating oil is used as the operating oil since a capillary seal utilizing a capillary action is required in the vicinity of the boundary surface between the operating oil and the external space, and a constituent member in a height direction does not vary depending on the kind of the operating oil. The application of the lipophobic agent on the surfaces of the constituent members disposed in the vicinity of the boundary surface between the operating oil and the external space is necessary both in the case of using the lubricating oil and in the case of using the magnetic fluid as the operating oil.

Figure 13:
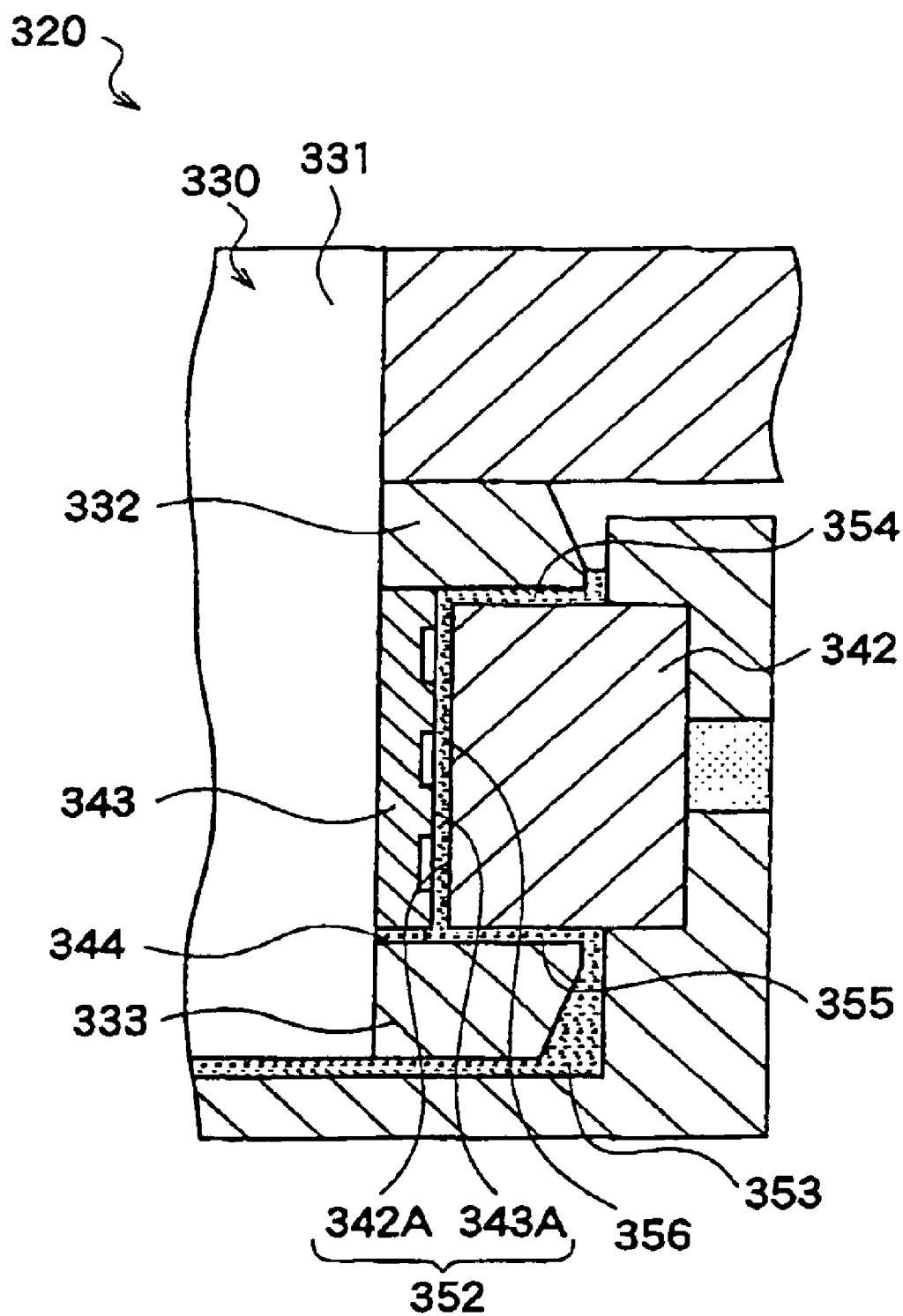
FIG. 13 is a cross sectional view showing a modification of the present invention.

Further, in the first embodiment described above, though methods as shown in FIG. 4, FIG. 5, and FIG. 7 to FIG. 10 are used in determining the distance between the lower end surface 32B and the upper end surface 33B, which face each other, of the first ring-shaped member 32 and the second ring-shaped member 33, the present invention is not limited to such methods, and may have a structure, for example, as shown in a dynamic pressure bearing device 320 in FIG. 13. In FIG. 13, a first and a second ring-shaped member 332, 333 are fixedly fitted to an outer peripheral surface of a rotating shaft member 331. The first and second ring-shaped members 332, 333 are fixed to the rotating shaft member 331 only with an adhesive which is applied on surfaces thereof to be fitted to the rotating shaft member 331. A spacer 343 having the same thickness as that of an intermediate member 342 and a metal leaf 344 are sandwiched between the first ring-shaped member 332 and the second ring-shaped member 333, and the distance between the facing surfaces of the first ring-shaped member 332 and the second ring-shaped member 333 is determined by these spacer 343 and metal leaf 344.

More specifically, no adhesive is applied on respective front and rear surfaces (respective upper and lower end surfaces) of the spacer 343 and the metal leaf 344. In this case, the intermediate member 342 and the spacer 343 are preferably worked in the same lot and worked synchronously. Further, the metal leaf 344 does not serve as an assembly jig but is a constituent member. In this structure, no adhesive layer is formed between the first ring-shaped member 332 and the second ring-shaped member 333 so that the total value of width dimensions of two-layered gaps 354, 355 of a thrust bearing portion can be set by a thickness dimension of the metal leaf 344, which makes it possible to realize the high-precision dynamic pressure bearing device 320. Incidentally, in this case, a journal bearing portion 352 is composed of an outer peripheral surface 343A of the spacer 343 constituting the rotating portion 330, an inner peripheral surface 342A, which faces this outer peripheral surface 343A, of the intermediate member 342, and an operating oil 353 for dynamic pressure generation filled in a third gap 356 formed between the outer peripheral surface 343A and the inner peripheral surface 342A which face each other.

Though each of the shapes of the pressure source side member 61, the O-ring receiving member 63, and the tight angle setting members 64, 66 is, for example, a column shape or a disk shape (refer to FIG. 3), it is not limited to the shape in the drawings and may be any shape, for example, a rectangular column shape, a square or rectangular plate shape, or the like as long as it is a shape capable of transmitting the pressure. However, from the viewpoint that the first ring-shaped member 32 and the second ring-shaped member 33 as the pressed members are in a circular ring shape and in view of facilitating manufacture of the assembly jigs themselves, and so on, these jigs are preferably in a column shape or a disk shape.

In each of the embodiments described above, the metal leaf 65 has a notch portion 65A formed by substantially U-shaped cutting, but the shape of the metal leaf is not limited to such a shape, nor is it necessary to constitute the metal leaf by one metal leaf. For example, a divided-type metal leaf in which two metal leaves each having a notch portion formed by semicircular-shape cutting are arranged with the notch portions thereof facing each other (an inserting portion for the rotating shaft member 31 is formed by facing the substantially semicircular notch portions each other to form a substantially circular shape) and the like may be used. In short, the metal leaf may be in any shape as long as the metal leaf in a sandwiched state can be pulled out after the first ring-shaped member 32 or the second ring-shaped member 33 is adhesively fixed to the rotating shaft member 31 while the pressure is applied with the metal leaf being sandwiched between the first ring-shaped member 32 and the second ring-shaped member 33.

As is described hitherto, according to the present invention, the width dimensions of the gaps in the thrust bearing portions can be determined without being influenced by the variation in thickness of the solidified adhesive layer and in addition, with a simple structure, so that such effects are brought about that the dynamic pressure bearing device can be miniaturized, can be made highly precise, and can cost low. Or, according to the present invention, since the first and second magnetic fluids having different concentrations are used as the operating oil or the effect of the lipophobic agent can be maintained or exerted, such an effect is brought about that the operating oil filled in the gaps of the dynamic pressure bearing portion can be prevented from flowing out to the external part.

What is claimed is:

1. A dynamic pressure bearing device, comprising:
   a rotating portion including a rotating shaft member disposed at a rotation center and a ring-shaped member fixedly fitted to an outer peripheral surface of this rotating shaft member;
   a fixed portion including a first member disposed on one end surface side of said ring-shaped member in terms of a thickness direction and a second member disposed on the other end surface side;
   a thrust bearing portion including respective facing surfaces of said ring-shaped member and said first member, an operating oil for dynamic pressure generation filled in a first gap formed between these facing surfaces, respective facing surfaces of said ring-shaped member and said second member, and an operating oil for dynamic pressure generation filled in a second gap formed between these facing surfaces;
   a journal bearing portion including respective facing surfaces of said first member and/or said second member and said rotating shaft member, and an operating oil for dynamic pressure generation which is filled in a third gap formed between these facing surfaces;
   a spacer, which is disposed between said first member and said second member on an outer periphery side of said ring-shaped member, having an equal thickness to that of said ring-shaped member; and
   a metal leaf, which is disposed between said first member and said second member on the outer periphery side of said ring-shaped member, having a thickness corresponding to a total value of width dimensions of said first and second gaps,
   wherein said spacer and said metal leaf have front and rear surfaces applied with no adhesive.

* * * * *